(12) United States Patent
Xue et al.

(10) Patent No.: US 10,863,460 B2
(45) Date of Patent: Dec. 8, 2020

(54) METHOD AND APPARATUS FOR SYNCHRONIZATION OPERATION IN CELLULAR INTERNET OF THINGS NETWORKS

(71) Applicant: Samsung Electronics Co., Ltd., Suwon-si (KR)

(72) Inventors: Peng Xue, Suwon-si (KR); Cheol Jeong, Seongnam-si (KR); Yeohun Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 15/458,472

(22) Filed: Mar. 14, 2017

(65) Prior Publication Data
US 2017/0265156 A1    Sep. 14, 2017

Related U.S. Application Data

(60) Provisional application No. 62/307,818, filed on Mar. 14, 2016.

(51) Int. Cl.
| | | |
|---|---|---|
| *H04W 56/00* | (2009.01) | |
| *H04L 5/00* | (2006.01) | |
| *H04W 4/70* | (2018.01) | |

(52) U.S. Cl.
CPC ......... *H04W 56/001* (2013.01); *H04L 5/0053* (2013.01); *H04L 5/0064* (2013.01);
(Continued)

(58) Field of Classification Search
CPC ....... H04W 36/04; H04W 36/24; H04W 4/70; H04W 72/04; H04W 72/0446;
(Continued)

(56) References Cited

U.S. PATENT DOCUMENTS

2010/0322178 A1    12/2010    Li et al.
2013/0039199 A1    2/2013    Liao et al.
(Continued)

FOREIGN PATENT DOCUMENTS

| CN | 101931485 A | 12/2010 |
|---|---|---|
| CN | 103053196 A | 4/2013 |

(Continued)

OTHER PUBLICATIONS

Intel Corporation, 'Operation mode indication and channel raster for NB-IoT', R1-160408, 3GPP TSG RAN WG1 Meeting #84, St Julian's, Malta, Feb. 6, 2016.
(Continued)

*Primary Examiner* — Hardikkumar D Patel
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A wireless device for receiving signals, a base station for transmitting a master information block (MIB) in a wireless communication network and a method therefore are provided. The wireless device comprises a receiver configured to receive, from a base station, a master information block (MIB) for a first communication using a first frequency bandwidth, and a processor configured to identify a frequency offset between a center frequency of the first frequency bandwidth and a channel raster for a second communication using a second frequency bandwidth based
(Continued)

on information in the MIB. The receiver is further configured to receive, from the base station, signals, through the first communication, based on the frequency offset. The first frequency bandwidth is narrower than the second frequency bandwidth.

8 Claims, 28 Drawing Sheets

(52) U.S. Cl.
    CPC ............. *H04L 5/0092* (2013.01); *H04W 4/70* (2018.02); *H04L 5/0037* (2013.01)

(58) Field of Classification Search
    CPC ........... H04W 72/0406; H04W 72/082; H04W 16/14; H04W 68/02; H04W 52/0216; H04W 52/0219; H04W 16/32; H04W 16/16; H04W 28/02; H04W 72/0426; H04W 28/0226; H04W 56/001; H04W 72/0453; H04L 5/0053; H04L 5/0098; H04L 5/001; H04L 27/0006; H04L 5/0092; H04L 1/0009; H04L 1/0011; H04L 1/0045; H04L 1/007; H04L 1/0041; H04L 27/26; H04L 27/2691; H04L 27/2655; H04L 5/0064; H04L 5/0037; H04L 25/02; H04L 5/005; H04L 25/0224; H04L 27/2613; H04L 5/0007; H03M 13/353; H04J 3/0647; H04J 3/1694; H04J 11/0073; H04J 11/0079; H04B 1/7143
    See application file for complete search history.

(56) References Cited

U.S. PATENT DOCUMENTS

| | | |
|---|---|---|
| 2014/0211754 A1 | 7/2014 | Li et al. |
| 2014/0269597 A1 | 9/2014 | Park et al. |
| 2014/0307700 A1 | 10/2014 | Seo et al. |
| 2015/0016239 A1 | 1/2015 | Yi et al. |
| 2015/0023197 A1 | 1/2015 | Iraji et al. |
| 2015/0071387 A1 | 3/2015 | Luo et al. |
| 2015/0117381 A1 | 4/2015 | Khoshnevis et al. |
| 2015/0207601 A1 | 7/2015 | Kim et al. |
| 2015/0245378 A1 | 8/2015 | Kim et al. |
| 2015/0341908 A1 | 11/2015 | Wang et al. |
| 2015/0365926 A1 | 12/2015 | Long |
| 2016/0037501 A1* | 2/2016 | Hamzeh ............. H03M 13/353 370/329 |
| 2016/0056977 A1 | 2/2016 | Wang et al. |
| 2016/0174014 A1 | 6/2016 | You et al. |
| 2016/0316442 A1* | 10/2016 | Seo ...................... H04W 76/14 |
| 2017/0064685 A1 | 3/2017 | Rico Alvarino et al. |
| 2017/0134881 A1 | 5/2017 | Oh |
| 2017/0208592 A1* | 7/2017 | Rico Alvarino ...... H04L 5/0048 |
| 2017/0237584 A1* | 8/2017 | Yan ...................... H04J 11/0073 370/330 |
| 2017/0251443 A1* | 8/2017 | Shin ...................... H04L 5/0098 |
| 2018/0006763 A1 | 1/2018 | Kim et al. |
| 2018/0013529 A1 | 1/2018 | You et al. |
| 2018/0146404 A1 | 5/2018 | Zhang et al. |

FOREIGN PATENT DOCUMENTS

| | | |
|---|---|---|
| CN | 104040919 A | 9/2014 |
| EP | 2941072 A1 | 4/2015 |
| WO | 2011-085191 A1 | 7/2011 |
| WO | 2014/101810 A1 | 7/2014 |
| WO | 2014-153777 A1 | 10/2014 |
| WO | 2016-111549 A1 | 7/2016 |
| WO | 2017/035238 A | 3/2017 |
| WO | 2017/123405 A1 | 7/2017 |

OTHER PUBLICATIONS

RAN4, 'LS on channel raster for NB-IoT', R1-161227, 3GPP TSG-RAN WG1 Meeting #84, St George's Bay, Malta, Feb. 24, 2016.
Mediatek Inc., 'Channel raster: NB-IoT PRB allocation in in-band deployment', R1-160832, 3GPP TSG RAN WG1 Meeting #84, St Julian's, Malta, Feb. 6, 2016.
RAN WG1, 'Reply LS on channel raster for Nb-IoT', R1-161269, 3GPP TSG-RAN WG1 Meeting #84, St Julian's, Malta, Feb. 24, 2016.
NEC Group: Downlink Reference Signal Enhancement for Low Cost MTC, 3GPP Draft; R1-132334, 3rd Generation Partnership Project (3GPP), Mobile Competence Centre; XP050698100, May 20-24, 2013.
LG Electronics: "RS design for NB-IoT downlink control and data transmissions", 3GPP Draft; R1-160116, 3rd Generation Partnership Project (3GPP), Mobile Competence Centre XP051053436, Jan. 18-20, 2016.
Sony: "MTC Operation with a Narrowband PDCCH", 3GPP Draft; R1-150428, 3rd Generation Partnership Project (3GPP), Mobile Competence Centre XP050933636, Feb. 9-13, 2015.
"3rd Generation Partnership Project; Technical Specification Group Radio Access Network; Evolved Universal Terrestrial Radio Access (E-UTRA); Physical Channels and Modulation (Release 9)", 3GPP Standard; Technical Specification; 3GPP TS 36.211, 3rd Generation Partnership Project (3GPP), Mobile Competence Centre; pp. 1-85, XP051296785, Mar. 21, 2010.
Chinese Office Action dated Apr. 16, 2020, issued in a counterpart Chinese Application No. 201680042282.9.
U.S. Office Action dated Feb. 28, 2020, issued in a counterpart Chinese Application No. 15/745,592.
Extended European Search Report dated Sep. 4, 2019, issued in a counterpart European application No. 19184102.2-1219.
U.S. Office Action dated Sep. 30, 2019, issued by the U.S. Appl. No. 15/745,592.
Extended European Search Report dated Nov. 9, 2019, issued in a counterpart European application No. 17766949.6-1219/3414955.
Samsung: "PBCH coverage enhancements for low-cost MTC UEs", 3GPP Draft; R1-131015, 3rd Generation Partnership Project (3GPP), Mobile Competence Centre; vol. RAN WG1, No.; Apr. 6, 2013; Chicago, USA.
MCC Support: "Draft Report of 3GPP TSG RAN WG1 #84 V0.1.0", 3GPP Draft; 3rd Generation Partnership Project (3GPP), Mobile Competence Centre; vol. RAN WG1, Feb. 22, 2016; Busan, South Korea.
WI Rapporteur (Ericsson): "RAN1 agreements for Rel-13 NBIoT", 3GPP Draft; R1-161548, 3rd Generation Partnership Project (3GPP), Mobile Competence Centre; vol. RAN WG1, No. 84 V0.1.0; Mar. 2, 2016; St. Julian's, Malta.
U.S. Notice of Allowance dated Jul. 28, 2020, issued in a U.S. Appl. No. 15/745,592.

* cited by examiner

FIG. 7
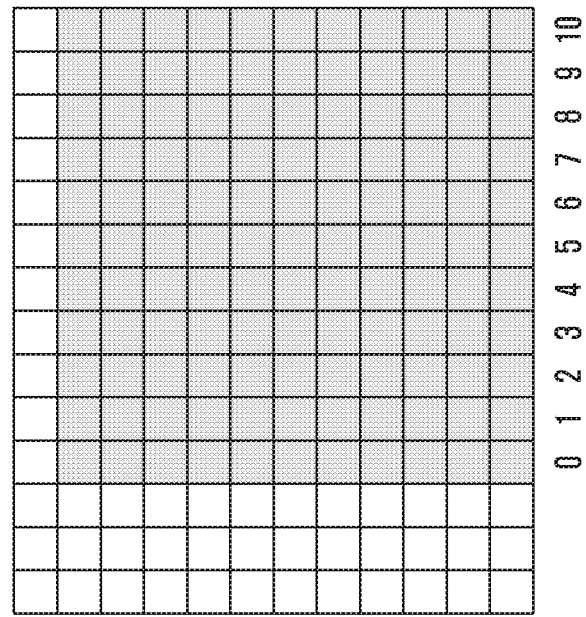
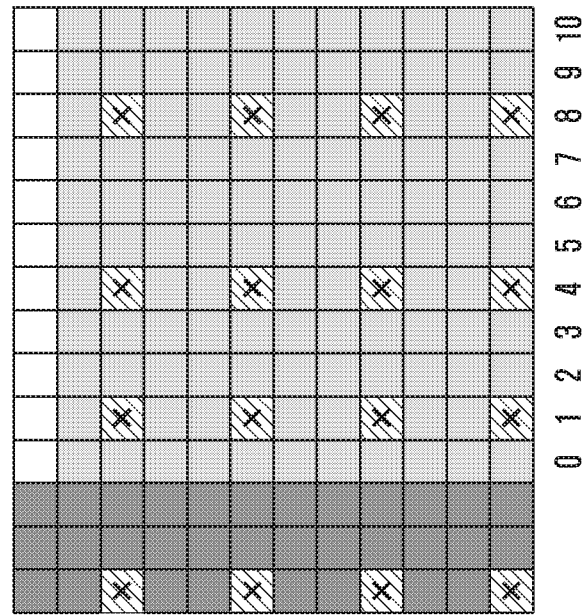

FIG. 10C

| | Mode Indication | | |
|---|---|---|---|
| Standalone | 0 | 0 | Standalone related indication |
| Guard-band | 0 | 1 | Guard-band related indication (channel raster offset) |
| In-band, different cell ID | 1 | 0 | In-band related indication (CRS port, channel raster offset) |
| In-band, same cell ID | 1 | 1 | In-band related indication (CRS port, channel raster offset, CRS information) |

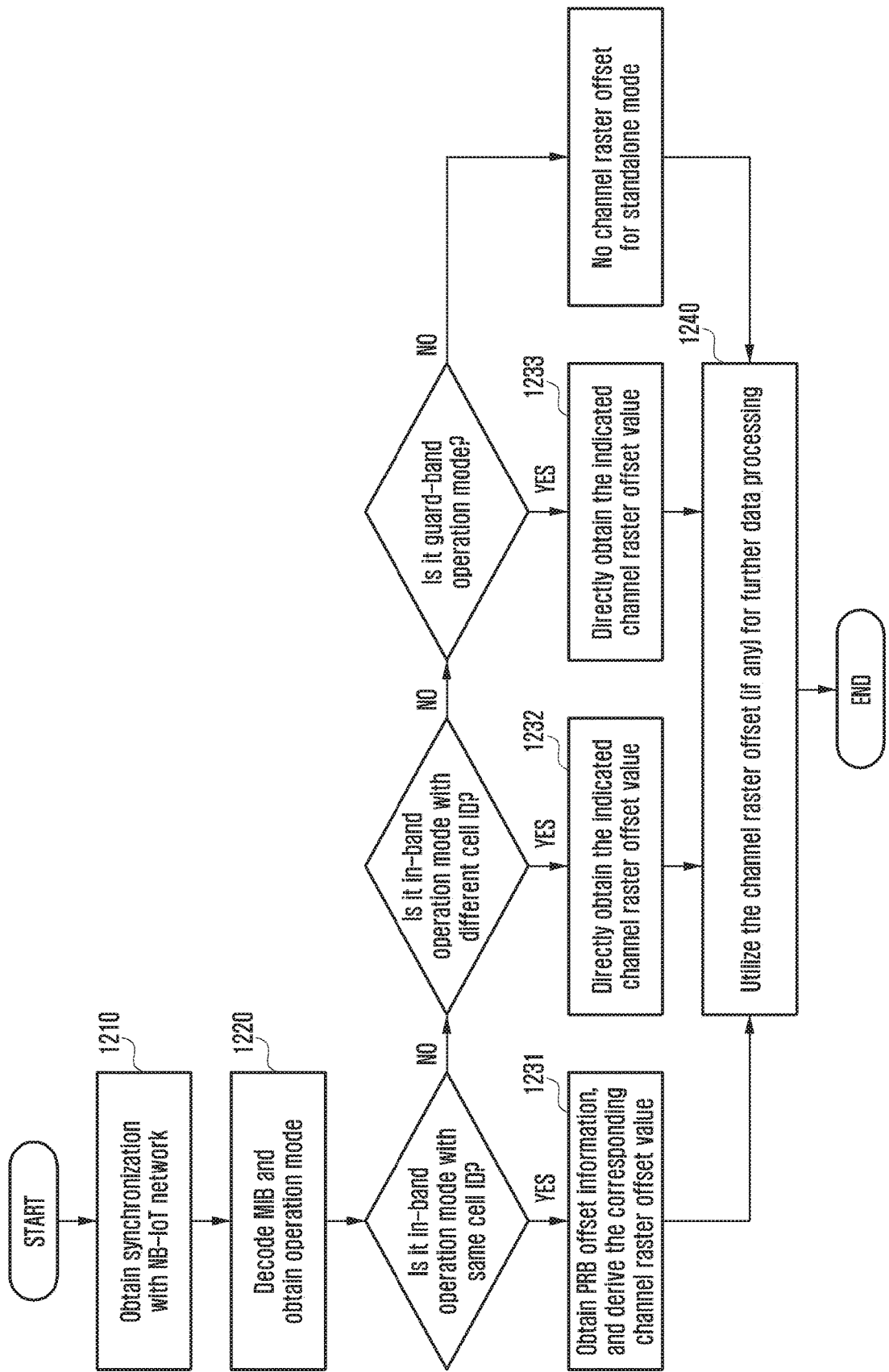

METHOD AND APPARATUS FOR SYNCHRONIZATION OPERATION IN CELLULAR INTERNET OF THINGS NETWORKS

CROSS-REFERENCE TO RELATED APPLICATION(S)

This application claims the benefit under 35 U.S.C. § 119(e) of a U.S. provisional patent application filed on Mar. 14, 2016 in the U.S. Patent and Trademark Office and assigned Ser. No. 62/307,818, the entire disclosure of which is hereby incorporated by reference.

TECHNICAL FIELD

The present disclosure relates to a cellular internet of things (CIoT). More particularly, the present disclosure relates to a method and an apparatus for synchronization operation of CIoT networks.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, in the cellular IoT (CIoT) network, one important feature is that it requires improved coverage to enable the MTC. For example, one typical scenario is to provide water or gas metering service via CIoT networks. Currently, most existing MTC/CIoT systems are targeting low-end applications that can be handled adequately by global system for mobile communications/general packet radio service (GSM/GPRS), due to the low-cost of devices and good coverage of GSM/GPRS. However, as more and more CIoT devices are deployed in the field, this naturally increases the reliance on GSM/GPRS networks. In addition, some CIoT systems are targeting standalone deployment scenarios by re-farming a GSM carrier with a bandwidth of 200 kHz.

As LTE deployments evolve, operators would like to reduce the cost of overall network maintenance by minimizing the number of radio access technologies (RATs). MTC/CIoT is a market that is likely to continue expanding in the future. This will cost operators not only in terms of maintaining multiple RATs, but it will also prevent operators from reaping the maximum benefit out of their spectrum. Given the likely high number of MTC/CIoT devices, the overall resource they will need for service provision may be correspondingly significant, and inefficiently assigned. Therefore, a need exists for migrating MTC/CIoT from GSM/GPRS to LTE networks.

In this disclosure, a new MTC/CIoT system is disclosed, which can be flexibly deployed in various ways, e.g., standalone, within the guard-band of a legacy cellular system (e.g., LTE), or within the bandwidth of a legacy cellular system (e.g., LTE).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for synchronization operation of cellular internet of things (CIoT) networks.

In accordance with a first aspect of the present disclosure, a method of a wireless device for receiving signals in a wireless communication network is provided. The method includes receiving, from a base station, a master information block (MIB) for a first communication using a first frequency bandwidth, identifying a frequency offset between a center frequency of the first frequency bandwidth and a channel raster for a second communication using a second frequency bandwidth based on information in the MIB, and receiving, from the base station, signals, through the first communication, based on the frequency offset. The first frequency bandwidth is narrower than the second frequency bandwidth.

In accordance with a second aspect of the present disclosure, a method of a base station for transmitting a MIB in a wireless communication network is provided. The method includes identifying an operation mode of a first communication using a first frequency bandwidth, and transmitting, to a wireless device, a MIB for the first communication based on the operation mode. The MIB includes information for obtaining frequency an offset between a center frequency of the first frequency bandwidth and a channel raster for a second communication using a second frequency bandwidth. The first frequency bandwidth is narrower than the second frequency bandwidth.

In accordance with a third aspect of the present disclosure, a wireless device for receiving signals in a wireless communication network is provided. The wireless device includes a receiver configured to receive, from a base station, a MIB for a first communication using a first frequency bandwidth, and a processor configured to identify a frequency offset between a center frequency of the first frequency bandwidth and a channel raster for a second communication using a second frequency bandwidth based on information in the MIB. The receiver is further configured to receive, from the base station, signals, through the first communication, based on the frequency offset. The first frequency bandwidth is narrower than the second frequency bandwidth.

In accordance with a fourth aspect of the present disclosure, a base station for transmitting a MIB in a wireless communication network is provided. The base station includes a processor configured to identify an operation mode of a first communication using a first frequency bandwidth, and a transmitter configured to transmit, to a wireless device, a MIB for the first communication based on the operation mode. The MIB includes information for obtaining frequency an offset between a center frequency of the first frequency bandwidth and a channel raster for a second communication using a second frequency bandwidth. The first frequency bandwidth is narrower than the second frequency bandwidth.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 illustrates an NB-PSS arrangement in a subframe according to an embodiment of the present disclosure;

FIG. 10C illustrates NB-MIB payload according to an embodiment of the present disclosure;

FIG. 12 illustrates a UE's behavior to receive and determine a channel raster offset related information according to an embodiment of the present disclosure;

Throughout the drawings, like reference numerals will be understood to refer to like parts, components, and structures.

DETAILED DESCRIPTION

Figure 1A:
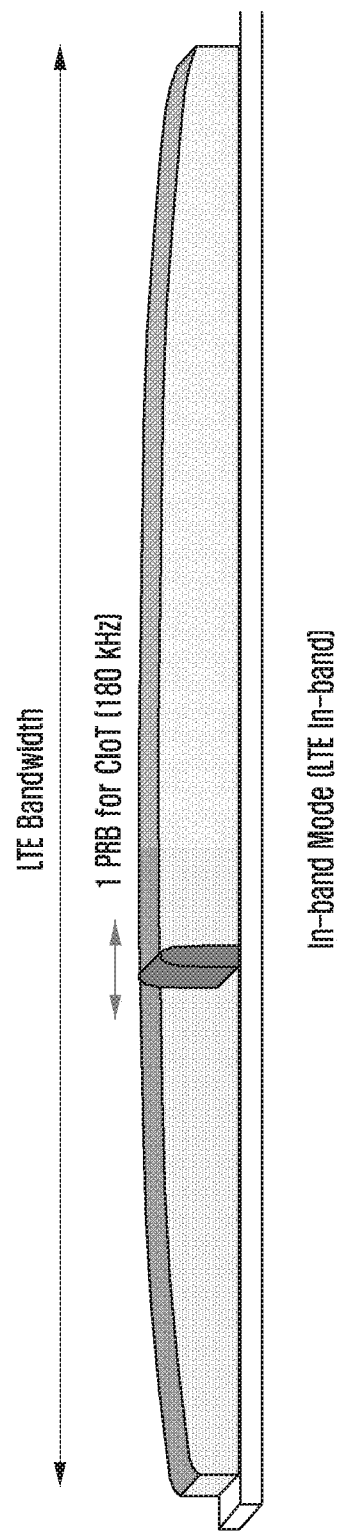
FIGS. 1A, 1B, and 1C illustrate cellular internet of things (CIoT) system deployment scenarios according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

The following description of embodiments is focused on the cellular internet of things (CIoT) or the narrowband IoT (NB-IoT) of the $3^{rd}$ generation partnership project (3GPP) long term evolution (LTE) system. However, it should be understood by those skilled in the art that the subject matter of the present disclosure is applicable to other computer/ communication systems having similar technical backgrounds and configurations without significant modifications departing from the spirit and scope of the present disclosure.

CIoT System Deployment Scenarios

Figure 1B:
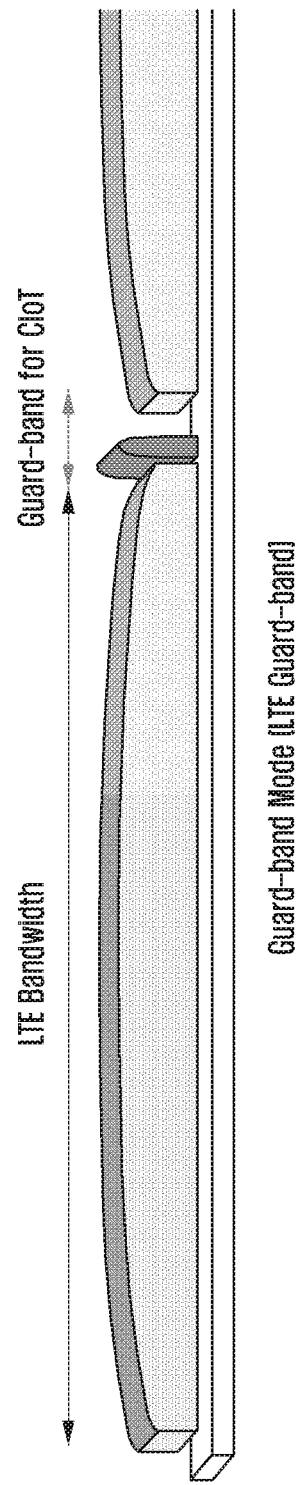
Figure 1C:
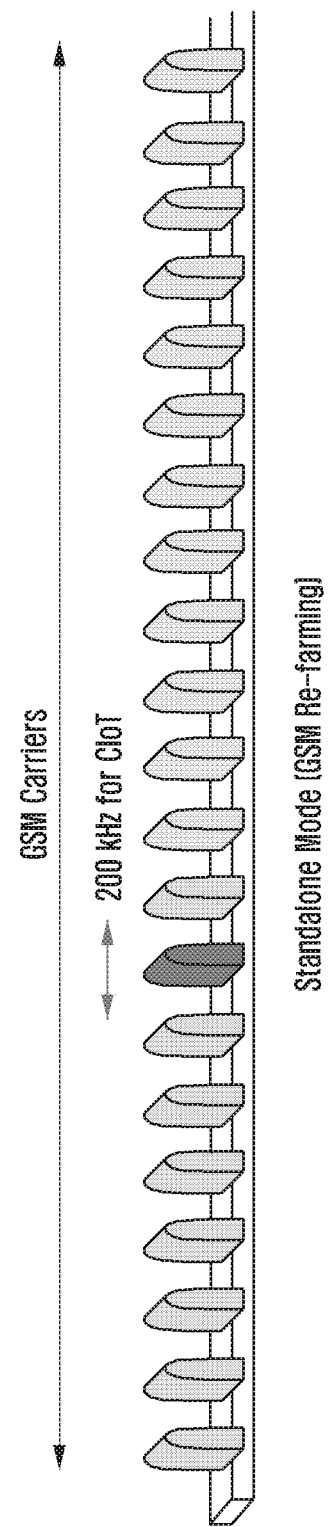

FIGS. 1A, 1B, and 1C illustrate CIoT system deployment scenarios according to an embodiment of the present disclosure.

Referring to FIGS. 1A, 1B, and 1C, the CIoT system occupies a narrow bandwidth, e.g., it uses a minimum system bandwidth of 200 kHz (or 180 kHz) on both downlink and uplink. Due to the narrow bandwidth feature, it can be deployed standalone, or within the guard-band of a legacy cellular system, or within the bandwidth of a legacy cellular system.

Since the physical resource block (PRB) bandwidth of a LTE system is 180 kHz, the CIoT system can be deployed in a certain PRB within the whole bandwidth, which can be called an in-band mode (FIG. 1A). In the in-band mode, operations utilize resource blocks within a normal LTE carrier. Alternatively, since the LTE system usually has a guard-band from 200 kHz to 2 MHz (depending on the system bandwidth of LTE system), the CIoT system can be deployed in the guard-band region of the LTE system, which is called a guard-band mode (FIG. 1B). In the guard-band mode, operations utilize the unused resource blocks within an LTE carrier's guard-band. It can be also deployed in a standalone mode, e.g., by re-farming a global system for mobile communication (GSM) carrier with a bandwidth of 200 kHz (FIG. 1C). In the stand-alone mode, operations utilize for example the spectrum currently being used by GSM enhanced data rates for GSM evolution (EDGE) radio access network (GERAN) systems as a replacement of one or more GSM carriers, as well as scattered spectrum for potential IoT deployment. The CIoT system will be called NB-IoT in the present disclosure due to the narrowband feature.

Figure 2A:
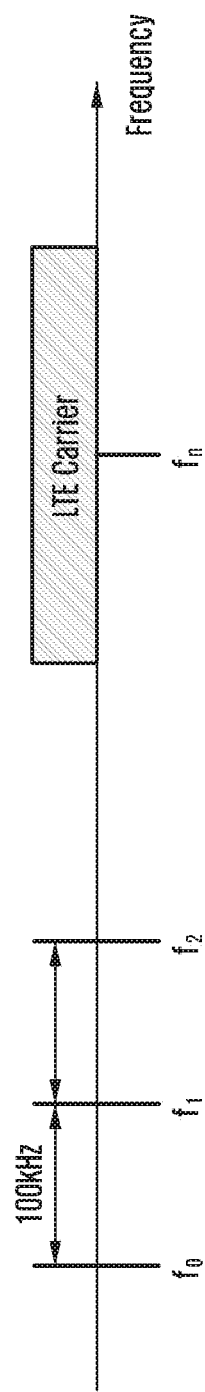
FIGS. 2A, 2B, and 2C illustrate long term evolution (LTE) system deployment scenarios and narrowband IoT (NB-IoT) system deployment scenarios according to an embodiment of the present disclosure.
Figure 2B:
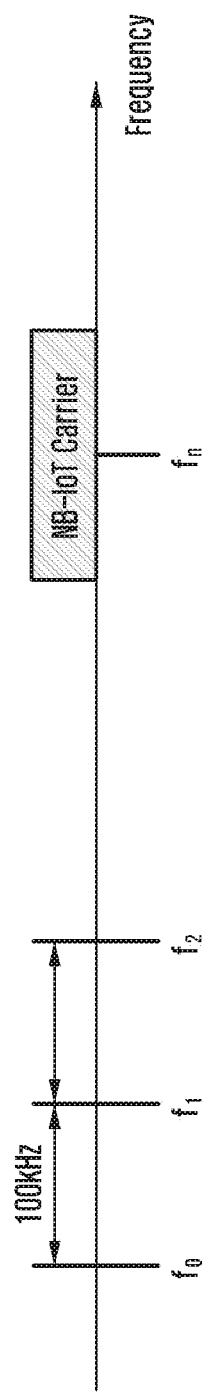
Figure 2C:
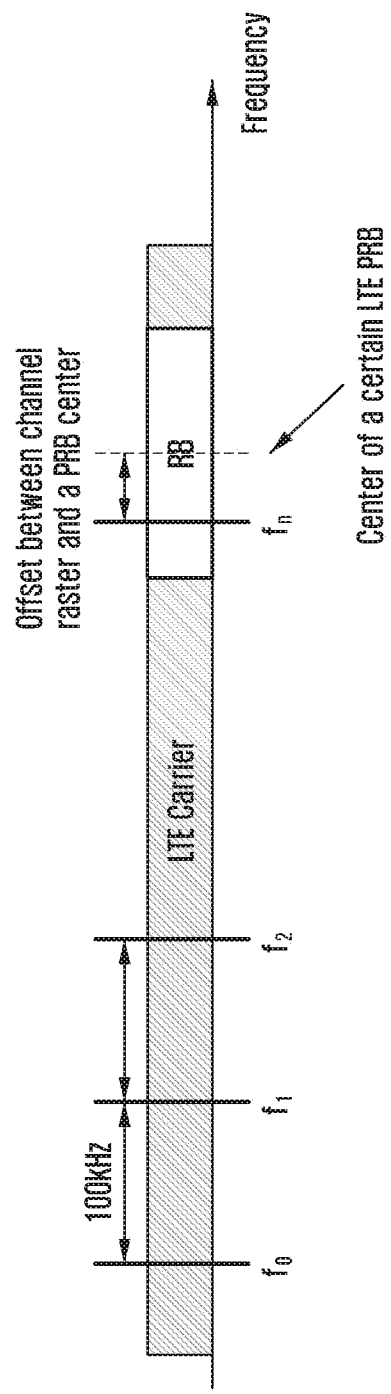

FIGS. 2A, 2B, and 2C illustrate LTE system deployment scenarios and NB-IoT system deployment scenarios according to an embodiment of the present disclosure.

Referring to FIGS. 2A, 2B, and 2C, in LTE, the channel raster is 100 kHz for all bands, which means that the carrier center frequency needs to be an integer multiple of 100 kHz. As illustrated in FIG. 2A, the candidate center frequency for an LTE carrier can be expressed by:

$$f_n = f_0 + 100 \text{ kHz} \times n$$

where $f_0$ is a reference frequency in a certain frequency band, and n is an integer to derive a certain center frequency $f_n$. When an LTE UE is turned on, it searches the LTE carrier from the candidate center frequencies with a step of 100 kHz raster, e.g., $f_0$, $f_1$, $f_2$, and so on. If an LTE UE detects the LTE carrier in a certain center frequency $f_n$, the user equipment (UE) assumes that fn is the center frequency of the current LTE carrier.

Similar to other cellular networks, such as LTE, the deployment of NB-IoT system needs to consider the channel raster requirement. For an NB-IoT standalone operation mode, the deployment rule can be the same as that in the LTE case, as illustrated in FIG. 2B.

However, in case of in-band and guard-band operation modes, the NB-IoT deployment needs to consider the already deployed legacy LTE carrier, and hence the requirement to deploy an NB-IoT carrier can be different from the standalone case. Specifically, the center of a certain PRB may not be always aligned with the candidate frequency with a 100 kHz channel raster for the LTE case. Considering the trade-off between deployment flexibility and performance degradations, it is possible to allow the NB-IoT deployment in the PRBs which has very small offset between the PRB center and channel raster, as illustrated in-band NB-IoT deployment in FIG. 2C. For more detail about a channel raster for in-band and guard-band operation modes of the NB-IoT, "NB-PSS/SSS Design," "NB-PBCH/NB-MIB Design," "Channel Raster Offset Information," "CRS Information," and "Indication Method for NB-IoT" will be described below.

NB-IoT System Time/Frequency Structure

Figure 3:
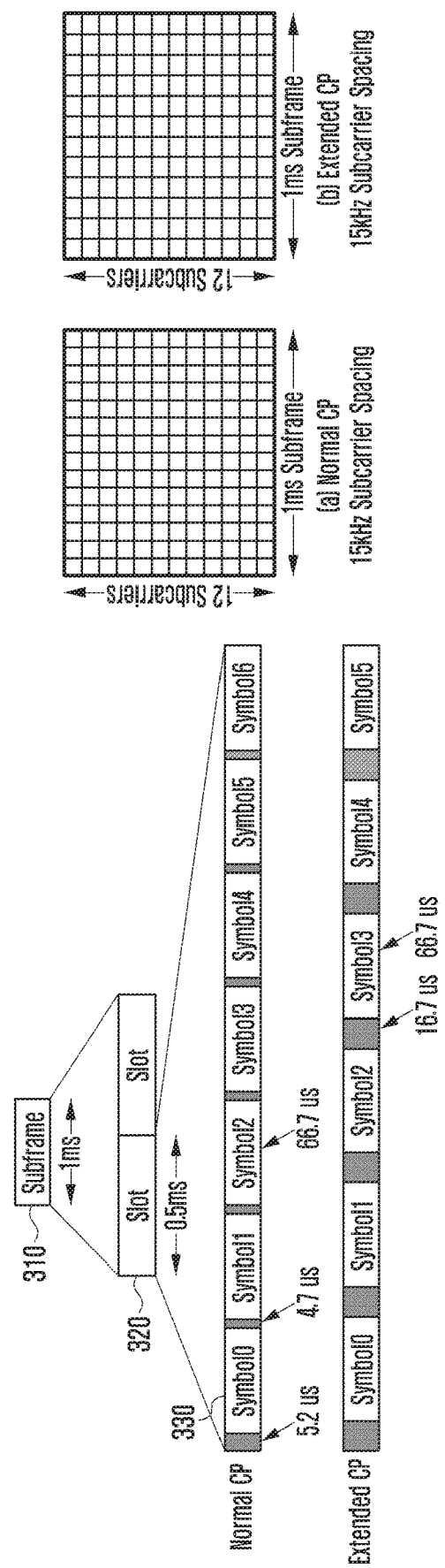
FIG. 3 illustrates NB-IoT subframes/slot structures according to an embodiment of the present disclosure.

FIG. 3 illustrates NB-IoT subframes/slot structures according to an embodiment of the present disclosure.

Referring to FIG. 3, it is desirable that the common system design and frame structure are considered for all the deployment scenarios. Furthermore, since the NB-IoT system supports LTE in-band deployment, the system should be designed considering compatibility and co-existence with legacy LTE system. To avoid any negative impact to the legacy LTE system, the LTE frame structure and numerology can be re-used as much as possible for an NB-IoT system, e.g., waveform, sub-carrier spacing. For example, with 15 kHz subcarrier spacing, the subframe/slot structure is same as that in LTE. The 15 kHz subcarrier spacing structure of FIG. 3 uses a 1 ms subframe 310, which may have two 0.5 ms slots 320. Each slot 320 may have seven symbols 330 using normal CP or six symbols 330 using extended CP. This can be considered for both downlink and uplink of NB-IoT.

Alternatively, since the transmit power of the NB-IoT device (or user equipment, UE) may be lower than that of the base station (BS), narrower subcarrier spacing, e.g., 3.75 kHz subcarrier spacing, can be considered to enhance the coverage.

The UE can determine a transmission scheme according to a condition of its coverage. For example, when the UE is in the bad coverage, the UE transmits data in a single subcarrier with 3.75 kHz carrier spacing. If the coverage is good, the UE transmits data in a single subcarrier or multiple subcarriers with 15 kHz carrier spacing.

NB-IoT Downlink Frame Structure

Figure 4:
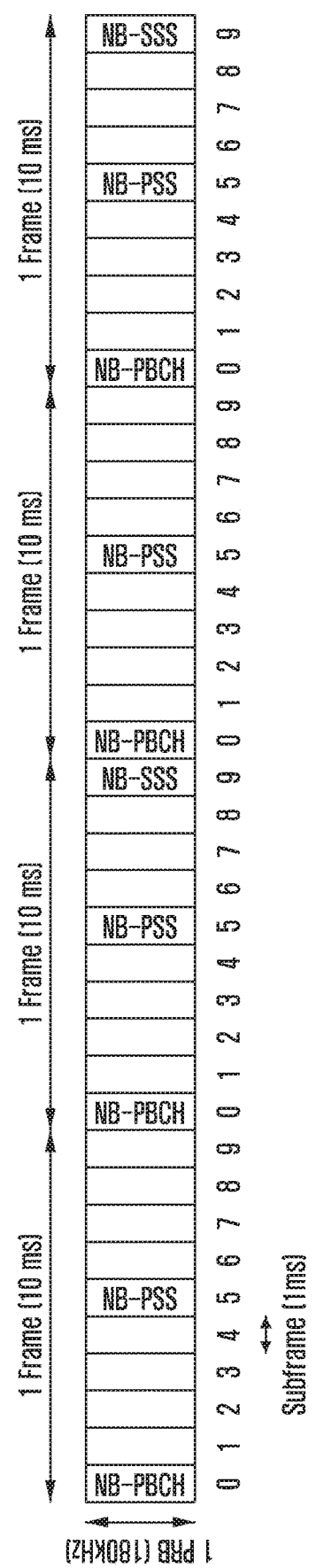
FIG. 4 illustrates an NB-IoT downlink frame structure according to an embodiment of the present disclosure.

FIG. 4 illustrates NB-IoT downlink frame structure according to an embodiment of the present disclosure.

Referring to FIG. 4, the NB-IoT downlink frame structure is aligned with the LTE system, to make it more suitable for an in-band deployment. The NB-IoT downlink has synchronization signals (i.e., NB-primary synchronization signal (NB-PSS) and NB-secondary synchronization signal (NB-SSS)), broadcast channels (i.e., NB-physical broadcast channel (NB-PBCH)), control channels (i.e., NB-physical downlink control channel (NB-PDCCH)) and data channels (i.e., NB-physical downlink shared channel (PDSCH)).

For NB-PSS, NB-SSS and NB-PBCH, it is beneficial to allocate them in the resources not collide with legacy LTE signals. The placement of NB-PSS, NB-SSS, and NB-PBCH is chosen to avoid collision with LTE cell-specific reference signal (CRS), positioning reference signal (PRS), PSS, SSS, PDCCH, physical control format indicator channel (PCFICH), physical hybrid-automatic repeat request (ARQ) indicator channel (PHICH) and multicast-broadcast single-frequency network (MBSFN) subframe. For example, in LTE frequency division duplexing (FDD) mode, Subframes #1, 2, 3, 6, 7 and 8 can be configured for MBSFN subframes. Thus, Subframe #0, 4, 5 and 9 can be considered for placement of NB-PSS/SSS and NB-PBCH.

Referring to FIG. 4, the NB-PSS may be placed in Subframe #9 every 10 ms, to avoid any potential collision with MBSFN subframe. The NB-SSS may be placed in Subframe #4 every 20 ms. The NB-PBCH may be placed in Subframe #0 every 10 ms. The other placement is also possible, by considering the above rule of collision avoidance with legacy LTE. The remaining resources can be allocated to NB-PDCCH and NB-PDSCH.

NB-PSS/NB-SSS Design

The NB-PSS and NB-SSS are transmitted to enable the UEs achieving time and frequency synchronization to the cell. Both NB-PSS and NB-SSS are transmitted with pre-defined density and period respectively.

Figure 5:
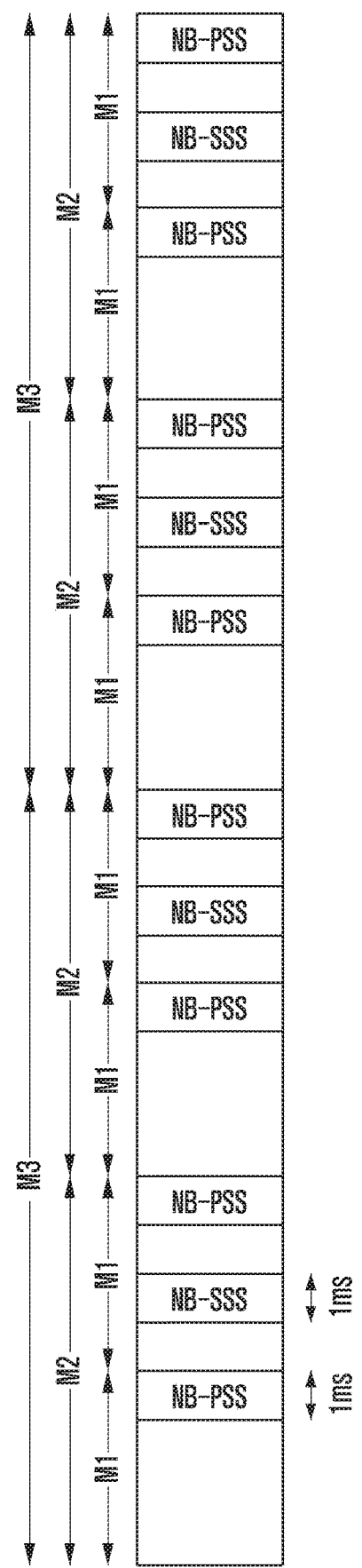
FIG. 5 illustrates time synchronization by NB-primary synchronization signal (PSS)/secondary synchronization signal (SSS) transmission according to an embodiment of the present disclosure.

FIG. 5 illustrates time synchronization by NB-PSS/SSS transmission according to an embodiment of the present disclosure.

Referring to FIG. 5, the NB-PSS is transmitted in one subframe every M1 subframes (e.g., M1=10 or 20), and NB-SSS is transmitted in one subframe every M2 subframes (e.g., M2=10 or 20 or 40). Detecting NB-PSS can derive the boundary of M1 subframes, while detecting NB-SSS can derive the boundary of M3 subframes, where M3 maybe multiple of M2. For example, M1=20, M2=40, M3=80. The boundary of M3 subframes can be aligned with the NB-PBCH transmission time interval (TTI) for easy implementation of NB-PBCH detection.

In addition, the UEs may obtain other system-specific or cell-specific information by receiving NB-PSS and NB-SSS, e.g., a CP length if the system supports more than one CP length, physical cell identification (PCID), a system mode (e.g., FDD or time division duplexing (TDD)), an operation mode (e.g., indicate in-band, guard-band or standalone), and so on. The CP length can be usually obtained by blind detection. The PCID is usually carried by the indices of NB-PSS and NB-SSS. If there are $N_{Total}^{PSS}$ NB-PSS indices, and $N_{Total}^{SSS}$ NB-SSS indices, there can be $N_{Total}^{PSS} N_{Total}^{SSS}$ indications. In case that there are two NB-SSS set, e.g., NB-SSS1 and NB-SSS2, the combined indication can be expressed by $N_{Total}^{PSS/SSS} = N_{Total}^{PSS} N_{Total}^{SSS} = N_{Total}^{PSS} N_{Total}^{SSS1} N_{Total}^{SSS2}$.

Figure 6A:
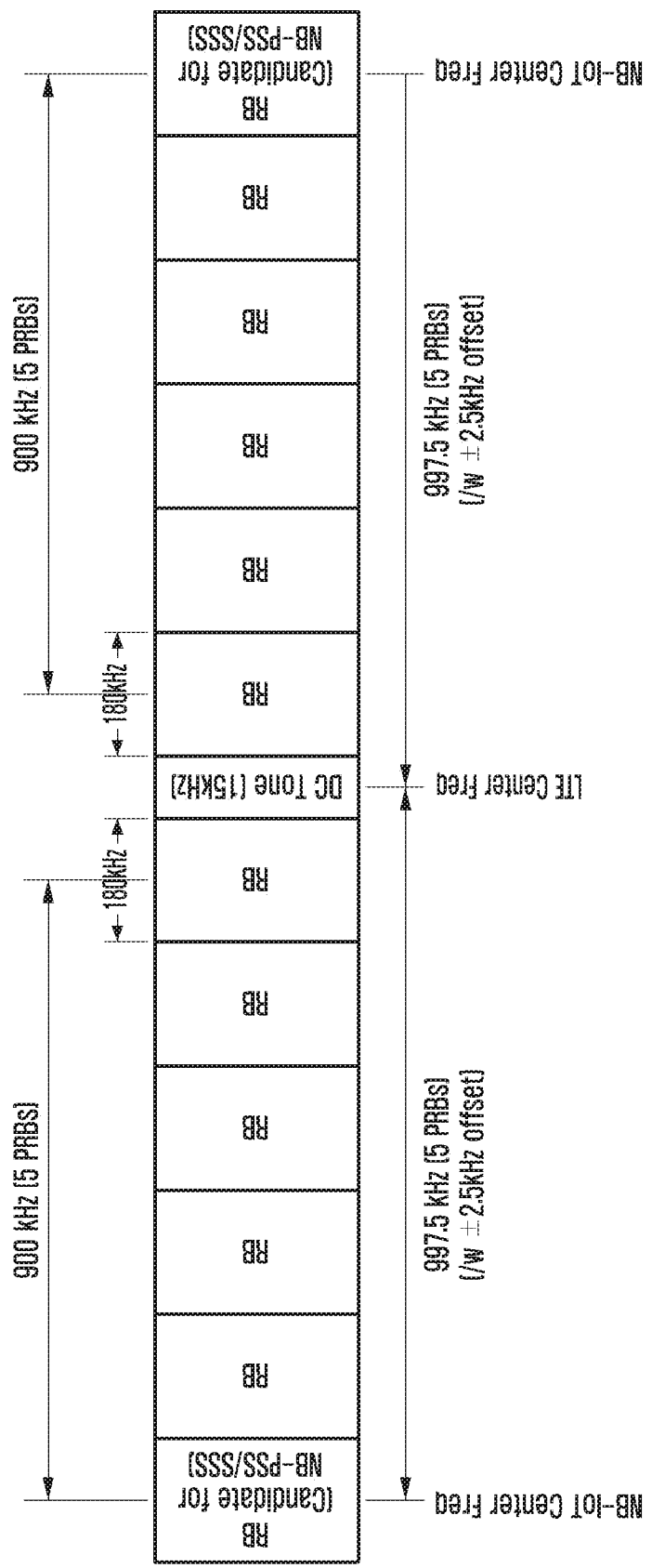
FIGS. 6A and 6B illustrate candidate physical resource blocks (PRBs) for an NB-PSS/SSS transmission in an in-band operation according to an embodiment of the present disclosure.
Figure 6B:
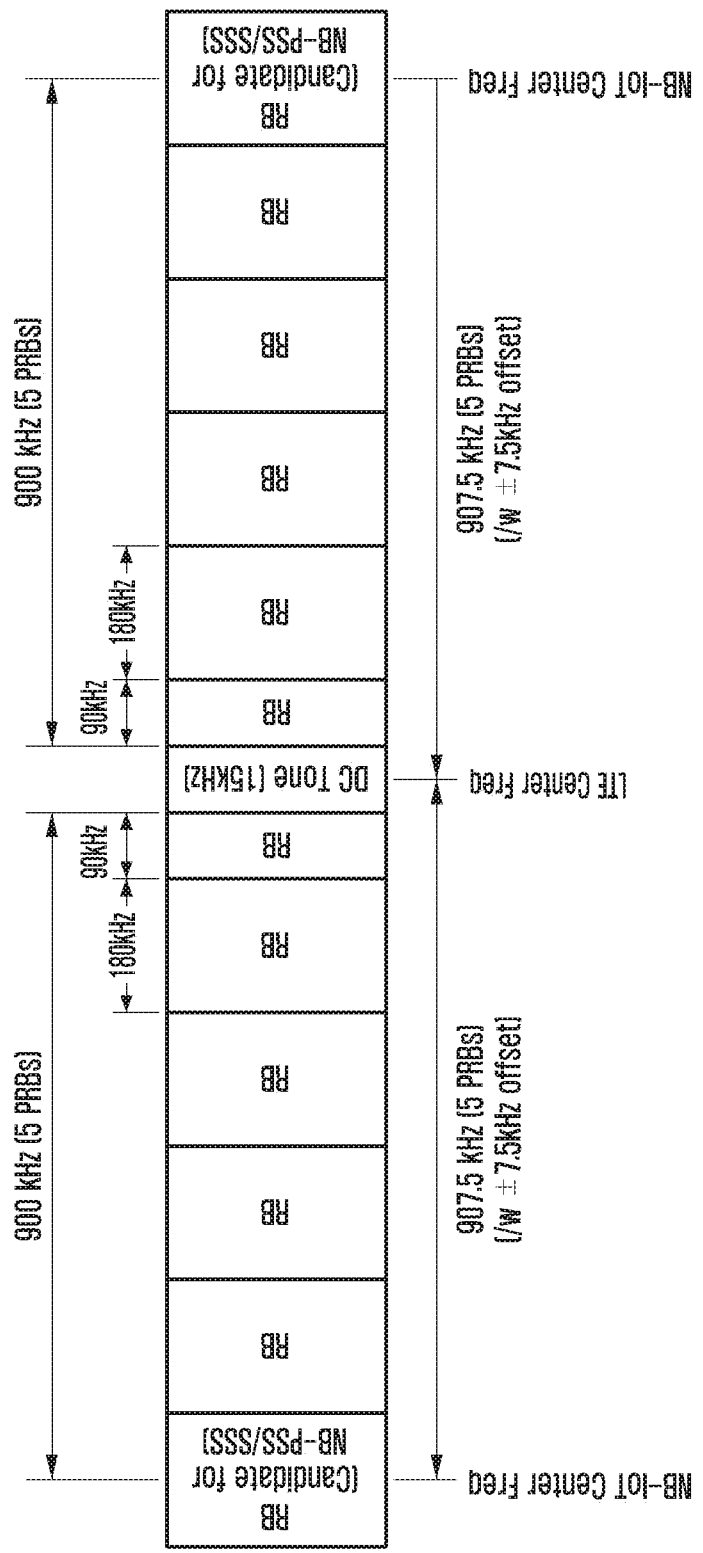

FIGS. 6A and 6B illustrate candidate PRBs for NB-PSS/SSS transmission in an in-band operation according to an embodiment of the present disclosure. Specifically, FIG. 6A illustrates a case of LTE BW with even number of RBs, FIG. 6B illustrates a case of LTE BW with odd number of RBs.

Referring to FIGS. 6A and 6B, for in-band operation, a pre-defined subset of PRBs can be used for NB-PSS/SSS transmission considering the LTE system bandwidth and system requirement. For example, if considering the 100 kHz channel raster, it is preferred that the frequency separation of the NB-IoT PRB from the LTE center frequency is close to the multiple times of 100 kHz with a maximum offset of Δ kHz (e.g., Δ=7.5). Based on this rule, the candidate PRBs for NB-PSS/SSS transmission can be determined. Referring to FIGS. 6A and 6B, for LTE BW with even number of PRBs, the candidate NB-IoT PRB center frequency may have a ±2.5 kHz offset to the channel raster, while for LTE BW with odd number of PRBs, the candidate NB-IoT PRB center frequency may have a ±7.5 kHz offset to the channel raster. The indices of candidate NB-IoT PRBs for in-band operation are listed in Table 1. Since the frequency offset between the NB-IoT PRB center frequency and channel raster is not known to the NB-IoT UEs, it is preferred to inform the NB-IoT UEs of the offset as early as possible, and hence UEs can compensate the offset to improve the receiver performance.

TABLE 1

| LTE BW (# RBs) | 3 MHz (15) | 5 MHz (25) | 10 MHz (50) | 15 MHz (75) |
|---|---|---|---|---|
| In-band PRB Indices for NB-PSS/NB-SSS Transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 |

For guard-band operation, there may be 4 cases of channel raster offset, ±2.5 kHz offset or ±7.5 kHz offset.

FIG. 7 illustrates an NB-PSS arrangement in a subframe according to an embodiment of the present disclosure.

Referring to FIG. 7, during an NB-PSS subframe, there are 11 short Zadoff-Chu (ZC) sequences, which are located in the last 11 OFDM symbols in a subframe, while the first 3 OFDM symbols are reserved for LTE control region. Each short ZC sequence may have a length of 11, i.e., occupying 11 tones (subcarriers) in an OFDM symbol. The indices of tones/subcarriers to carry NB-PSS short sequences can be determined by the following options:

Embodiment 1

The 11 tone indices are fixed, e.g., the lower 11 continuous tones, as shown in FIG. 7.

Embodiment 2

The 11 tone indices can be either the lower 11 continuous tones, or the higher 11 continuous tones, based on a pre-defined rule or system requirement.

Figure 8A:
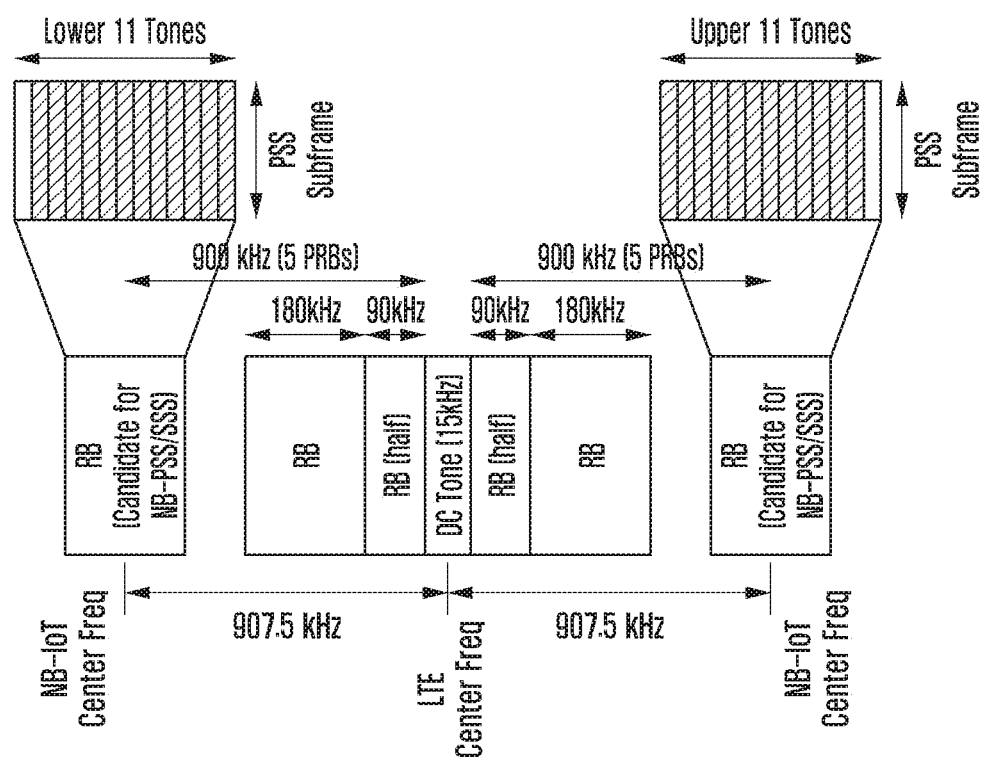
FIGS. 8A and 8B illustrate NB-PSS resource element (RE) usages in an in-band operation according to an embodiment of the present disclosure.
Figure 8B:
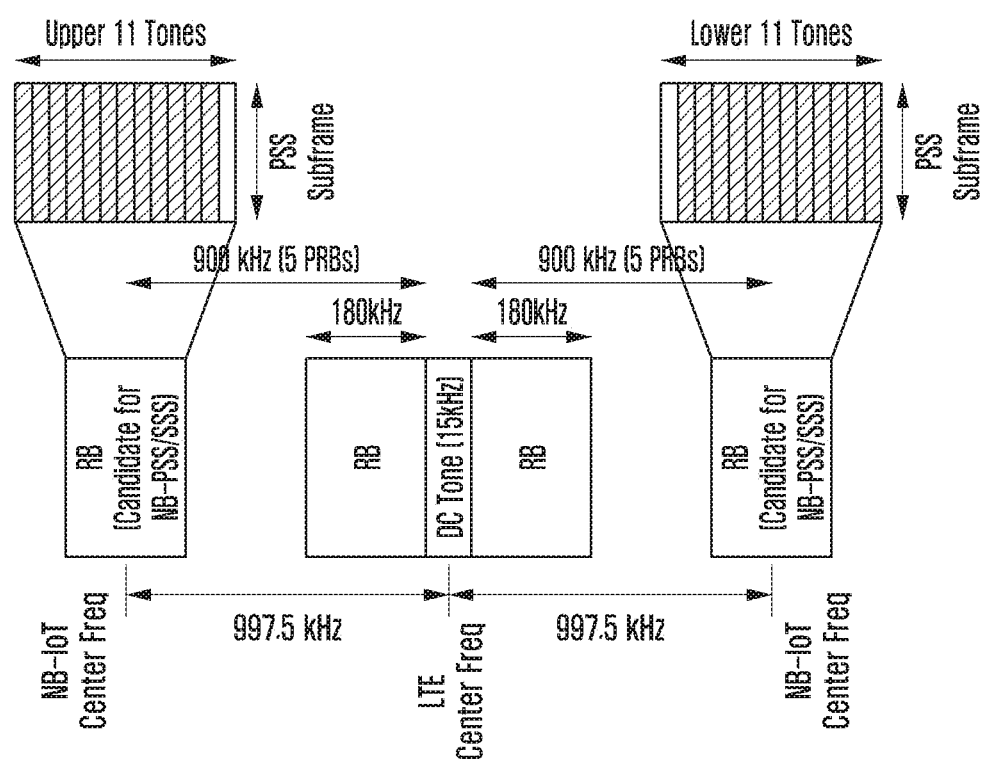

FIGS. 8A and 8B illustrate NB-PSS resource element (RE) usages in an in-band operation according to an embodiment of the present disclosure.

Referring to FIGS. 8A and 8B, since there is a frequency offset between the NB-IoT PRB center frequency and channel raster, the 11 tones closet to the channel raster can be used for NB-PSS short sequence transmission in a certain PRB. As shown in FIGS. 8A and 8B, the indices of 11 tones for NB-PSS short sequence transmission in a certain PRB may be different depending on the system BW, and PRB location. For LTE BW with even number of RBs, the PRB in the upper half BW uses the upper 11 tones for NB-PSS short sequence transmission, while the PRB in the lower half BW uses the lower 11 tones. This can minimize the frequency separation between the channel raster and center tone of the 11 tones used for NB-PSS short sequence transmission. Similarly, for LTE BW with odd number of RBs, the PRB in the upper half BW uses the lower 11 tones for NB-PSS short sequence transmission, while the PRB in the lower half BW uses the upper 11 tones.

NB-PBCH/NB-MIB Design

In NB-IoT system, the essential system information for initial access to a cell (called master information block, i.e., NB-MIB) is carried on NB-PBCH.

The NB-MIB may include the following contents:

1) System Frame Number: To support in-band operation, the timing between LTE and NB-IoT needs to be aligned. The LTE frame timing has a periodicity of 10240 ms. After cell search and PBCH decoding, NB-IoT UE has found 640 ms timing. Additional 4 bits is needed to help UE obtain the remaining timing information. When considering extended discontinuous reception (DRX), it may be preferred to further extend frame cycle by using e.g., 6 additional bits.

2) System information (SI) Change Indication: To be able to quickly determine if the System Information has changed one possible option is to have indication included in MIB. This information could also be included in system information block 1 (SIB1), as in LTE.

3) SIB1 Scheduling Information: SIB1 can be scheduled without PDCCH and the scheduling parameters are indicated in MIB.

4) Operation Mode Indication: Since three or more different operation modes are considered, the operation modes need to be differentiated as quickly as possible, since the succeeding processing may be different (1 bit: to indicate in-band or not; 2 bits: to indicate in-band, guard-band or standalone; or 2 bit: to indicate in-band case 1, in-band case 2, guard-band or standalone, the in-band case 1 can be the case that LTE and NB-IoT share the same cell ID, while the in-band case 2 can be the case that LTE and NB-IoT have different cell ID).

5) LTE (CRS) Antenna Ports Information: This is needed for in-band deployment to inform NB-IoT UEs about the number of antenna ports used by LTE CRS. This information is needed because the antenna ports used for LTE and NB-IoT may be different. For example, 4 antenna ports are used in LTE, but only up to 2 antenna ports are used for NB-IoT. Even though NB-IoT UEs detect the usage of 2 antenna ports in PBCH decoding, the actual number of antenna ports needs to be known and taken into account in the resource mapping process. 2 bits can be used to indicate the number of antenna ports in LTE, e.g., 1, or 2, or 4. Since 4 values can be indicated, it is possible to reserve one value for other indication. For example, 2 bits (00, 01, 10, 11) can respectively indicate that there are 0, 1, 2, 4 legacy CRS antenna ports. The indication of 0 legacy CRS antenna port implicitly means the current mode is not in-band, i.e., guard-band or standalone. In this case, there is no need of explicit mode indication field. Alternatively, 1 bit can be used to indicate if the number of antenna ports is 4 or not (i.e., less than 4), or indicate if the number of NB-IoT antenna ports is the same as the number of LTE antenna ports. If the number of antenna ports is less than 4 (i.e., 1 or 2), the UE may assume that the number of antenna ports for NB-IoT and LTE is the same.

6) Channel Raster Offset: This is needed for in-band/guard-band deployment to enable NB-IoT obtain the information on frequency offset between the NB-IoT center frequency and channel raster. As described above, there may be frequency offset of ±2.5 kHz or ±7.5 kHz depending on the LTE system BW and PRB locations.

7) CRS Information: This is needed for in-band deployment to enable NB-IoT re-uses LTE CRS. The CRS position information is known from cell search but the sequence value is not available.

8) FDD/TDD Mode Information: This is needed to inform NB-IoT UEs that the current mode is FDD or TDD.

Channel Raster Offset

The following options can be used to indicate the raster offset:

Embodiment 1: 2 bits to indicate the 4 cases

Raster Offset of (+2.5 kHz)
Raster Offset of (−2.5 kHz)
Raster Offset of (+7.5 kHz)
Raster Offset of (−7.5 kHz)

Embodiment 2: 3 bits to indicate the up to 8 cases

Raster Offset of (+2.5 kHz)
Raster Offset of (−2.5 kHz)
Raster Offset of (+7.5 kHz)
Raster Offset of (−7.5 kHz)
Raster Offset of (0 kHz)
Raster Offset of (X kHz)
Raster Offset of (Y kHz)
Raster Offset of (Z kHz)

According to the indication, e.g., a field of 'Channel Raster Offset' in NB-MIB, the UE may know the offset between channel raster and center frequency of NB-IoT PRB, and hence compensate the frequency offset in the receiver processing.

CRS Information

In the LTE system, the CRS is transmitted in the full bandwidth for channel estimation and reference signals received power (RSRP) measurements. The CRS is transmitted in the NB-IoT PRB of the in-band operation mode. It is beneficial to re-use the LTE CRS in the NB-IoT PRB for channel estimation. The positions of resource elements for CRS transmission in the frequency domain is determined by the LTE cell ID. The cell-specific frequency shift is given by $v_{shift}=N_{ID}^{Cell,LTE}$ mod 6. The transmitted CRS symbols are determined by cell ID, slot index, CP length, and BW (i.e., $N_{RB}^{DL}$). In addition, the CRS transmission is also related to the number of CRS antenna port, i.e., antenna port 0 only, or antenna port (0, 1), or antenna port (0, 1, 2, 3). It is noted that the actual PRB index in the LTE system bandwidth can be derived based on the PRB offset to center frequency and bandwidth. Alternatively, the PRB index can be explicitly indicated.

Embodiment 1

In Table 1, there are total 46 candidate PRBs. Thus, 6 bits can be used to indicate 64 candidates, which can include the following cases:
  46 cases for in-band operation mode (as shown in Table 1)
  4 case for guard-band operation mode (no CRS information, but channel raster offset information only)
  +7.5 kHz, −7.5 kHz, +2.5 kHz, −2.5 kHz
  1 case for standalone operation mode
  Other cases reserved for future use Embodiment 2

Figure 9:
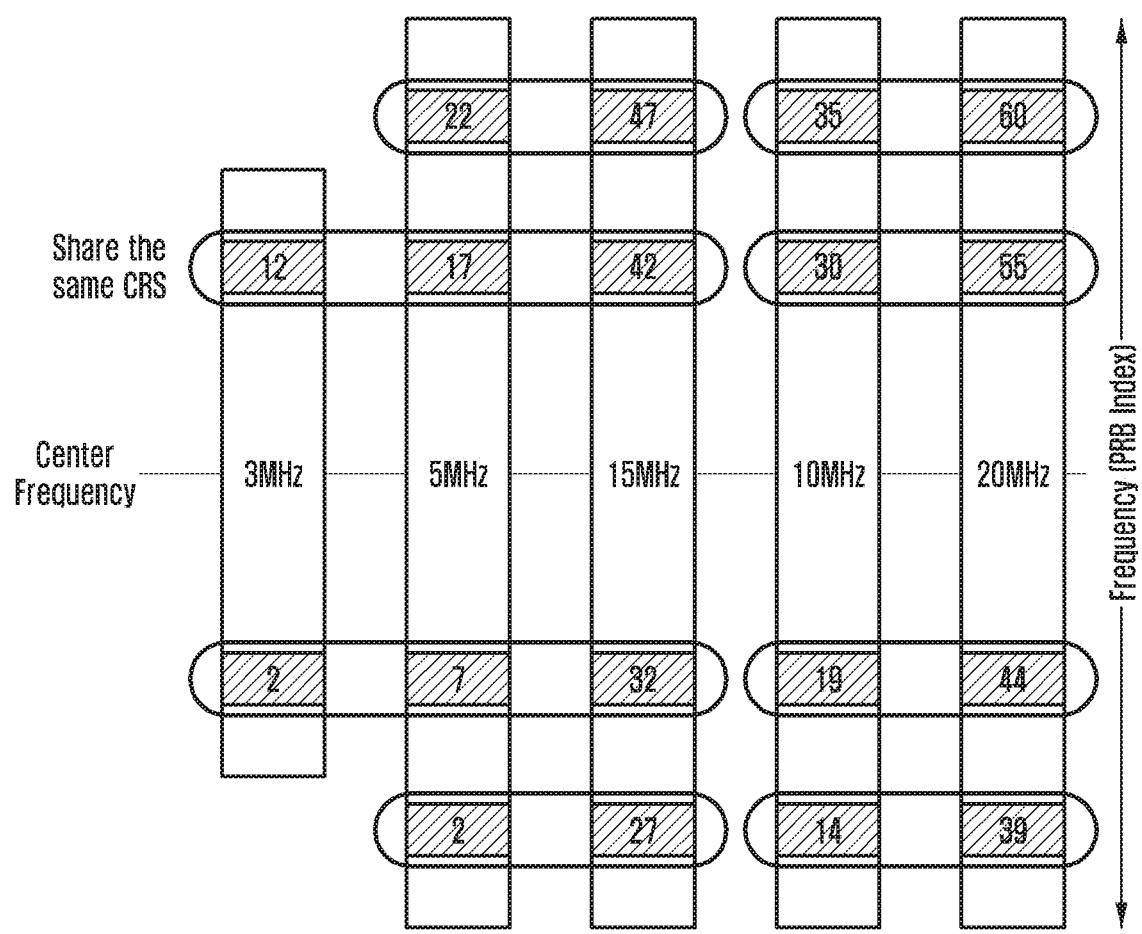
FIG. 9 illustrates NB-IoT in-band PRB candidates according to an embodiment of the present disclosure.

FIG. 9 illustrates NB-IoT in-band PRB candidates according to an embodiment of the present disclosure.

Referring to FIG. 9, the LTE CRS sequence values in a certain PRB are actually only related to the offset to the center frequency. If the PRBs share the same offset to the center frequency, the same CRS sequence values are used, which is independent to the BW. The PRB offset in 15 MHz BW case includes other cases of BW with odd number of PRBs, i.e., 3 MHz and 5 MHz. The PRB offset in 20 MHz BW case includes other case of BW with even number of PRBs, i.e., 10 MHz. There are total 32 offsets, which include 18 offset for BW with even number of PRBs, and 14 offsets for BW with odd number of PRBs. Thus, it is possible to use only 5 bits to indicate the PRB offset related to the center frequency:
  BW with Even Number of PRB: Up to 18 offsets
  BW with Odd Number of PRB: Up to 14 offsets The offset can be mapped to the CRS sequence indices, as listed in Table 2.

TABLE 2

| LTE BW (# RBs) | 3 MHz (15) | 5 MHz (25) | 10 MHz (50) | 15 MHz (75) | 20 MHz (100) |
|---|---|---|---|---|---|
| In-band PRB Indices for NB-PSS/NB-SSS Transmission (n_PRB) | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |
| CRS Index m | | | 2*n_PRB, 2*n_PRB + 1 | | |
| CRS Index m' | | | m' = m + $N_{RB}^{max,DL} - N_{RB}^{DL}$ | | |
| | (99, 100), (119, 120) | (89, 90), (99, 100), (119, 120), (129, 130) | (68, 69), (78, 79), (88, 89), (98, 99), (120, 121), (130, 131), (140, 141), (150, 151) | (39, 40), (49, 50), (59, 60), (69, 70), (79, 80), (89, 90), (99, 100), (119, 120), (129, 130), (139, 140), (149, 150), (159, 160), (169, 170), (179, 180) | (18, 19), (28, 29), (38, 39), (48, 49), (58, 59), (68, 69), (78, 79), (88, 89), (98, 99), (120, 121), (130, 131), (140, 141), (150, 151), (160, 161), (170, 171), (180, 181), (190, 191), (200, 201) |

After all the above parameters are signaled in the NB-IoT system explicitly or implicitly, the NB-IoT devices can utilize the LTE CRS for downlink channel estimation. The CP length can be determined in the NB-IoT PSS/SSS detection process. The remaining parameters may be conveyed in the synchronization signals, NB-MIB. In NB-MIB, there can be 1 bit indication, to indicate if the current NB-IoT cell ID is the same as the LTE cell ID.

The NB-IoT PRB location is also necessary to UEs to derive the CRS sequence values. The PRB index can be explicitly or implicitly indicated in NB-MIB.

Operation Mode Indication

The operation mode can be explicitly indicated in the broadcast information. A field of 'Operation Mode Indication' can be added in NB-MIB carried by NB-PBCH (1 bit: in-band or not; 2 bits: guard-band, standalone, in-band case 1, in-band case 2).

If the operation mode is explicitly indicated, the contents and interpretations of NB-MIB can be different for different operation mode. For example, the pre-defined K (K≥1, e.g., K=2) most significant bit (MSB) or least significant bit (LSB) can be used for operation mode indication.

Figure 10A:
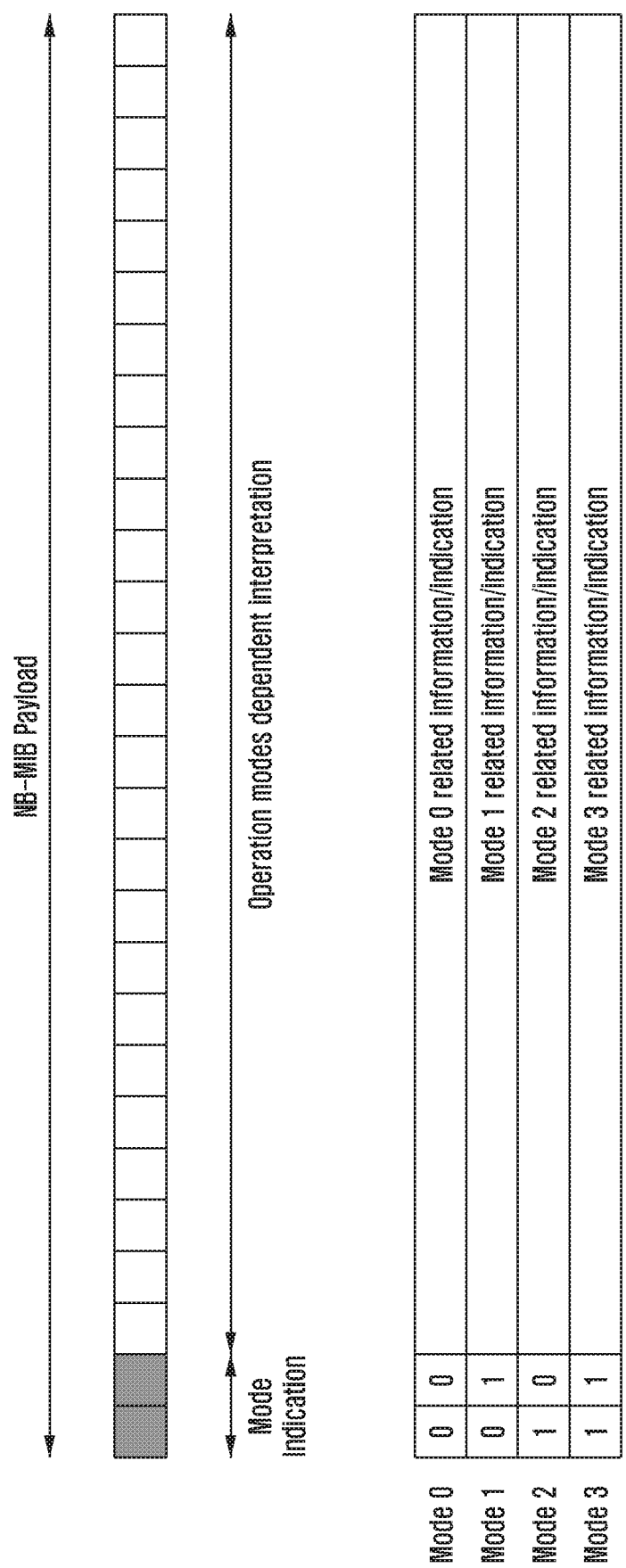
FIGS. 10A and 10B illustrate NB-master information block (MIB) payload according to an embodiment of the present disclosure.
Figure 10B:
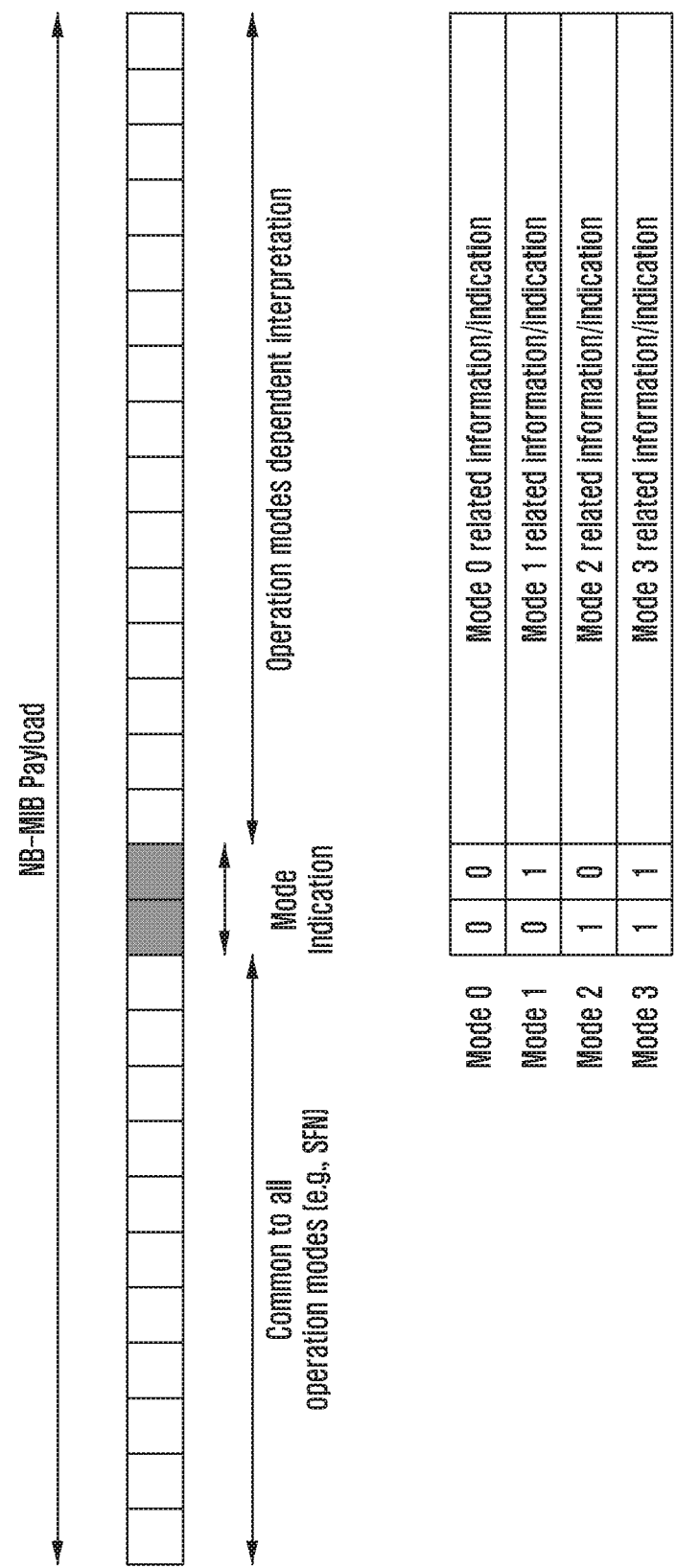

FIGS. 10A and 10B illustrate an NB-MIB payload according to an embodiment of the present disclosure.

Referring to FIG. 10A, the first two bits can be used for operation mode indication. In addition, the interpretations of the remaining bits can depend on the operation mode.

Referring to FIG. 10B, there is no limitation to put the mode indication field in MSB or LSB. It is also possible to separate the common contents and operation mode related information.

FIG. 10C illustrates an NB-MIB payload according to an embodiment of the present disclosure.

Referring to FIG. 10C, the first bit of mode indication can be used to indicate in-band or not in-band. If not in-band, the next bit can be used to differentiate standalone or guard-band. If in-band, the next bit can be used to indicate two different cases, e.g., the cell ID of NB-IoT and LTE is same or not. If the cell ID is same, CRS information can be indicated to enable NB-IoT UEs to re-use LTE CRS for channel estimation. Some examples are shown below:

Guard-band:
  Channel raster offset is indicated (e.g., 2 bits)
    +7.5 kHz, −7.5 kHz, +2.5 kHz, −2.5 kHz
In-band with different cell ID:
  CRS port number (1 or 2 bits):
    1 bit: the CRS port number is 4 or not (less than 4)
    2 bits: the CRS port number is 1, 2, or 4
  Channel raster offset is indicated (e.g., 2 bits)
    +7.5 kHz, −7.5 kHz, +2.5 kHz, −2.5 kHz
In-band with same cell ID:
  CRS port number (1 or 2 bits):
    1 bit: the CRS port number is 4 or not (less than 4)
    2 bits: the CRS port number is 1, 2, or 4
  CRS information is indicated (e.g., 5 or 6 bits)
    5 bits: Indicate the PRB offset related to the center frequency:
      BW with Even Number of PRB: Up to 18 offsets
      BW with Odd Number of PRB: Up to 14 offsets
    6 bits: Indicate the PRB index:
      Include 46 cases for in-band operation mode (as shown in Table 1)
    It is noted that the channel raster offset can be derived based on the PRB offset information In summary, NB-MIB mode indication and mode related indications can be shown as the following Table 3.

TABLE 3

| Mode | Mode dependent indication |
| --- | --- |
| 00 | Standalone: reserved for future usage |
| 01 | Guard-band: 2 bits for channel raster offset (+7.5 kHz, −7.5 kHz, +2.5 kHz, −2.5 kHz) |
| 10 | In-band with different cell ID: 1 bit for CRS port number (4 or not), 2 bits for channel raster offset (+7.5 kHz, −7.5 kHz, +2.5 kHz, −2.5 kHz) |
| 11 | In-band with same cell ID: 1 bit for CRS port number, 5 bits for CRS information and channel raster offset (32 PRB offsets from center frequency) |

Figure 11A:
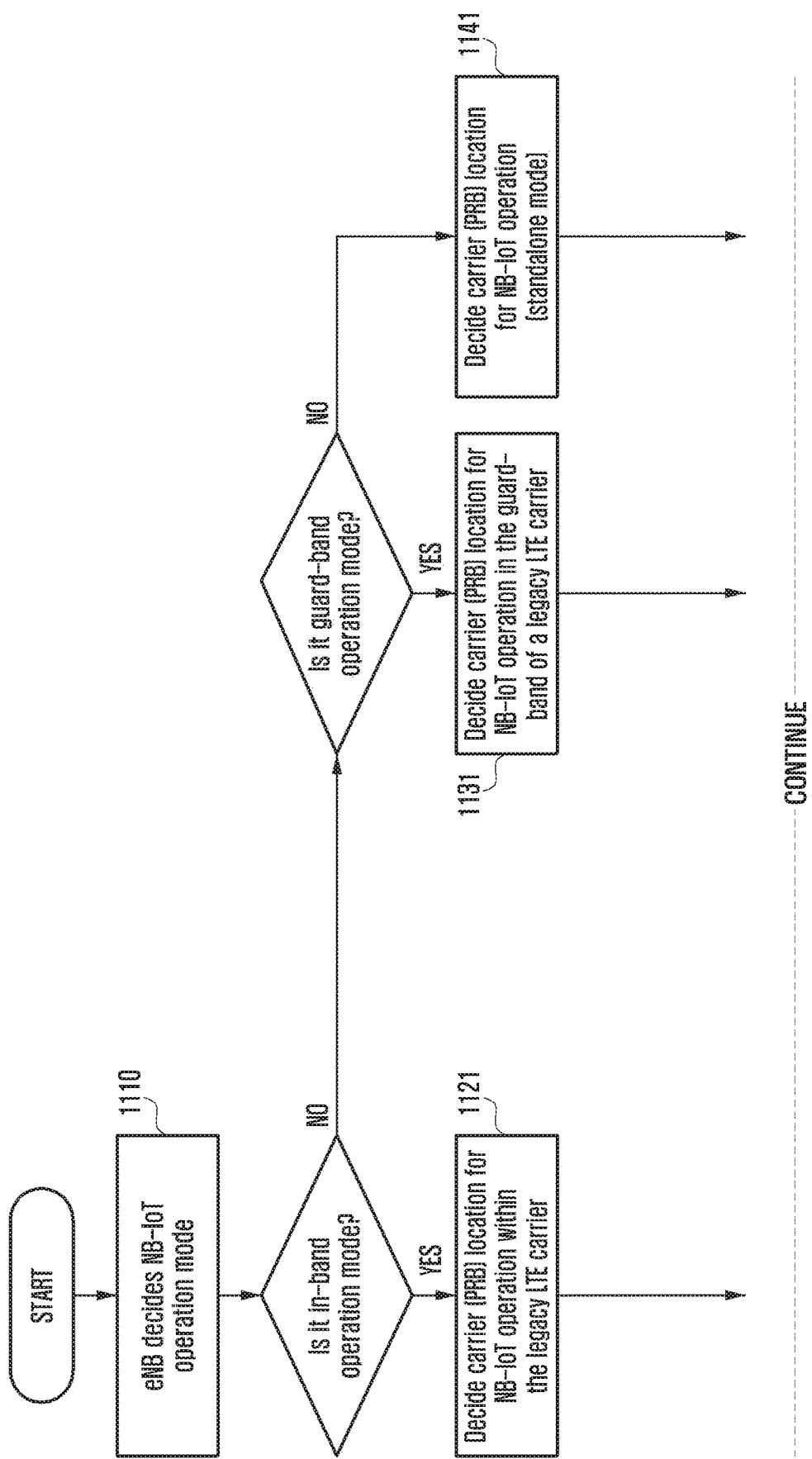
FIGS. 11A and 11B illustrate an eNB's behavior to determine an NB-IoT operation mode and transmit channel raster offset related information according to an embodiment of the present disclosure.
Figure 11B:
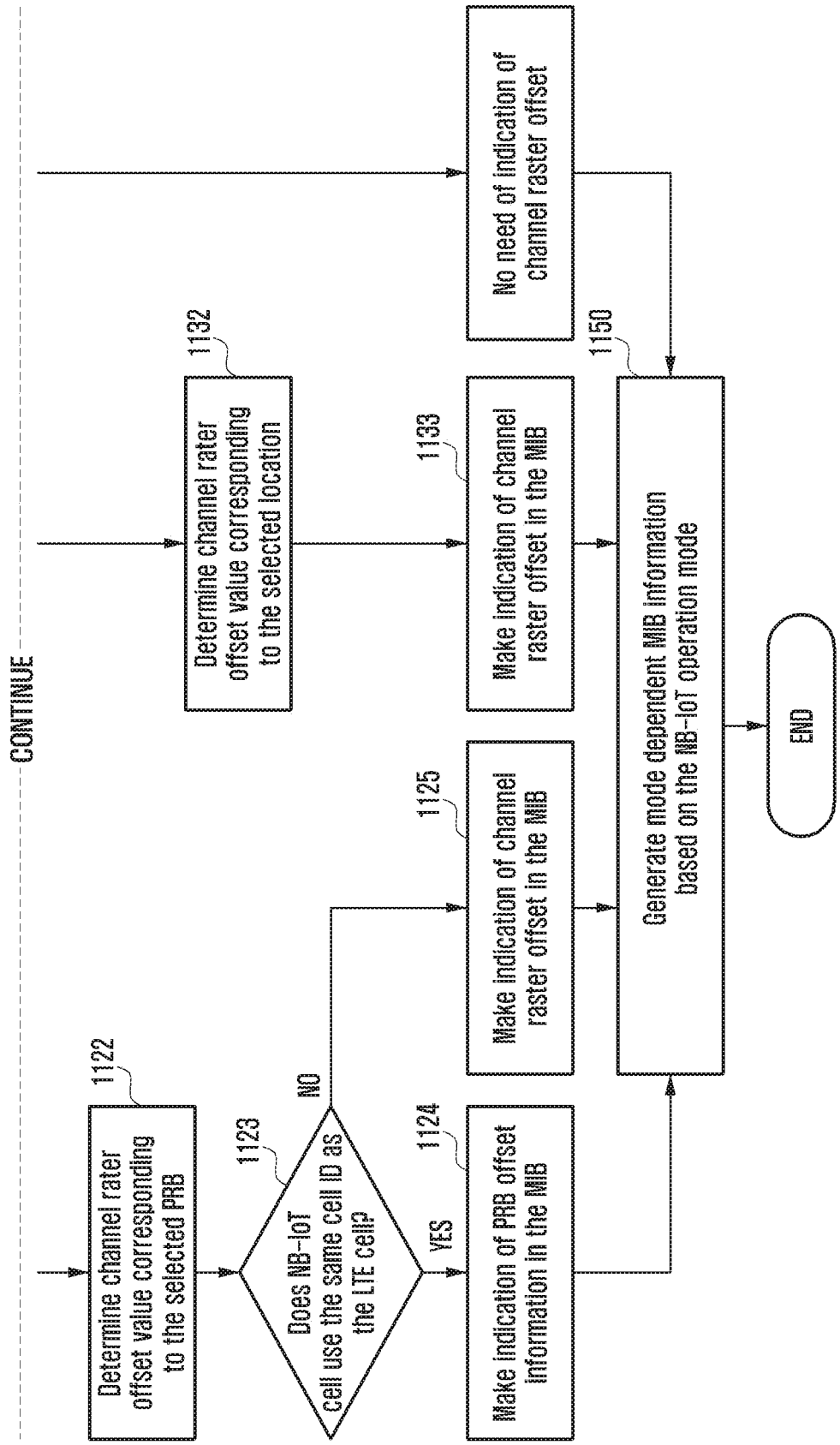

FIGS. 11A and 11B illustrate an eNB's behavior to determine an NB-IoT operation mode and transmit channel raster offset related information according to an embodiment of the present disclosure.

Referring to FIGS. 11A and 11B, based on the deployment scenario or operation mode of NB-IoT network, the eNB behavior can be different. Accordingly, an eNB determines an operation mode at operation 1110.

For in-band operation mode, the eNB determines the carrier (PRB) location from the candidate PRB set within a legacy LTE carrier at operation 1121, determines channel raster offset value corresponding to the selected PRB at operation 1122, and determines whether the NB-IoT cell uses the same cell ID as the LTE cell at operation 1123. Meanwhile, the PRB location can be expressed by an offset value from the center frequency, which implicitly includes a channel raster offset value. Accordingly, as described above, if the NB-IoT cell shares the same cell ID as the legacy LTE cell, the eNB just indicates the PRB offset information in the MIB at operation 1124, and there is no need to indicate the explicit channel raster offset value since the channel raster offset value can be derived based on the PRB offset information. However, if different cell ID is used between the NB-IoT cell and the legacy LTE cell, the PRB offset information is not indicated in the MIB, and therefore the channel raster offset value is explicitly indicated in MIB at operation 1125.

For guard-band operation mode, the eNB determines the carrier (PRB) location in the guard-band of a legacy LTE carrier at operation 1131. Depending on the locations and legacy LTE carrier BW, the corresponding channel raster offset may be different. The eNB determines the channel raster offset at operation 1132, and make explicit indication in the MIB at operation 1133.

For stand-alone operation mode, the eNB determines the carrier location and transmit signals in the corresponding location at operation 1241. There is no need to make any further indication about the channel raster offset.

After operation 1124, 1125, 1133 or 1141, the eNB generates mode dependent MIB information based on the NB-IoT operation mode at operation 1150.

FIG. 12 illustrates a UE's behavior to receive and determine a channel raster offset related information according to an embodiment of the present disclosure.

Referring to FIG. 12, the UE obtains synchronization with NB-IoT network at operation 1210.

When an NB-IoT UE obtains synchronization to the network, the UE decodes MIB and obtains the indicated operation mode at operation 1220.

Depending on the indicated operation mode, the NB-IoT UE obtains the corresponding channel raster offset. If it is indicated as in-band operation mode with the same cell ID between NB-IoT and legacy LTE, the UE obtains the PRB offset information, and derives the channel raster offset value corresponding to the indicated PRB offset case at operation 1231. If it is indicated as in-band operation mode with the different cell ID between NB-IoT and legacy LTE, the UE directly obtain the indicated channel raster offset value at operation 1232. If it is guard-band operation mode, the UE can directly obtain the indicated channel raster offset value at operation 1233. For standalone operation mode, there is no any indication related to channel raster offset.

After operation 1231, 1232 or 1233, the UE utilizes the channel raster offset, if any, for further data processing at operation 1240.

Figure 13:
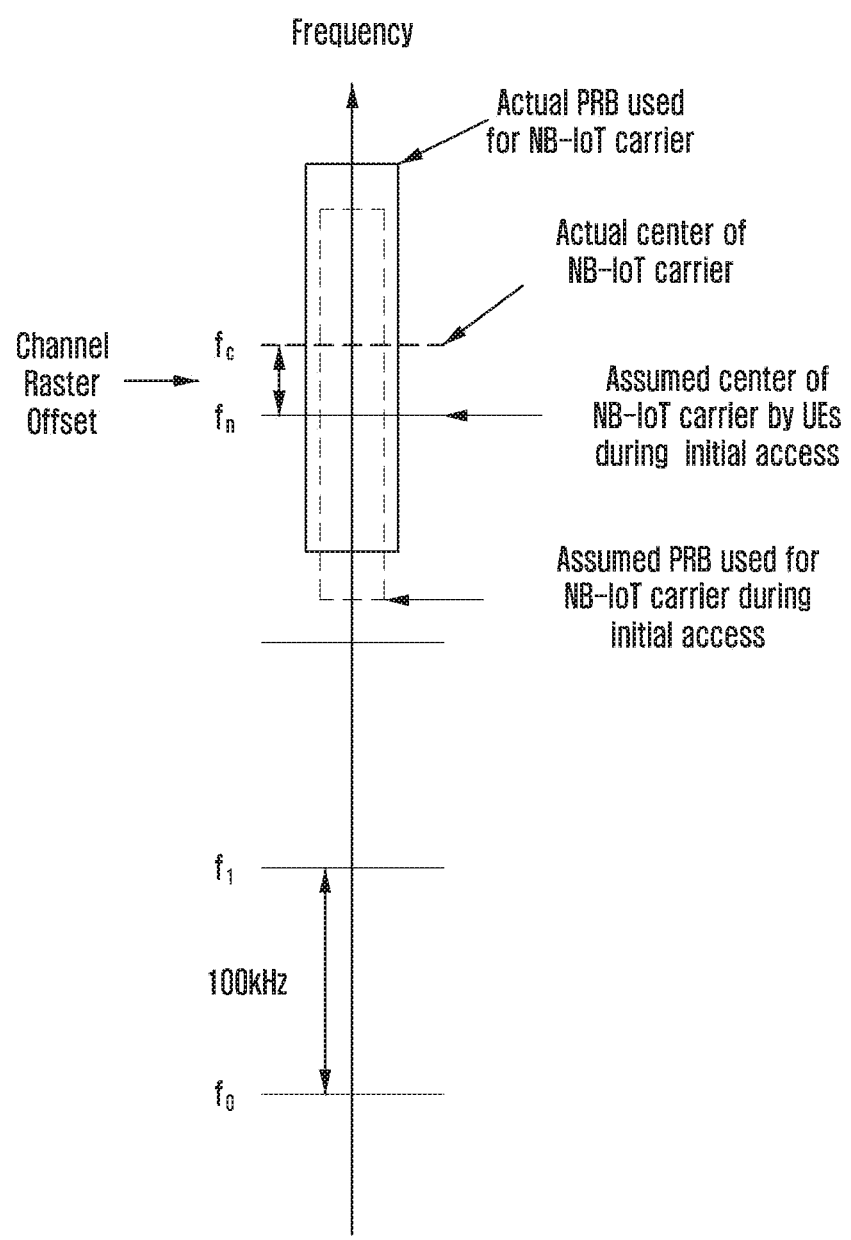
FIG. 13 illustrates an NB-IoT in-band deployment with a channel raster offset according to an embodiment of the present disclosure.

FIG. 13 illustrates an NB-IoT in-band deployment with a channel raster offset according to an embodiment of the present disclosure.

Referring to FIG. 13, the center of PRB used for an NB-IoT carrier does not align with the candidate frequency with 100 kHz channel raster. When an NB-IoT UE is turned on, it searches the NB-IoT carrier from the candidate center frequencies with a step of 100 kHz raster, e.g., $f_0$, $f_1$, $f_2$, and so on. The PRB with a center frequency $f_c$ (a full lined box in the figure) is a candidate PRB to deploy an NB-IoT carrier, which means the difference between $f_n$ and $f_c$ is less than 7.5 kHz. The eNB determined to deploy NB-IoT carrier in that PRB, while a UE detects the NB-IoT carrier based on the assumed center frequency $f_n$ (a broken lined box in the figure). The channel raster offset, e.g., difference between the channel raster and actual center frequency of NB-IoT carrier, is indicated to the UE in an explicit or implicit manner, as described above.

After obtaining the indication of channel raster offset, the NB-IoT UEs can utilize this value for further data processing.

Figure 14A:
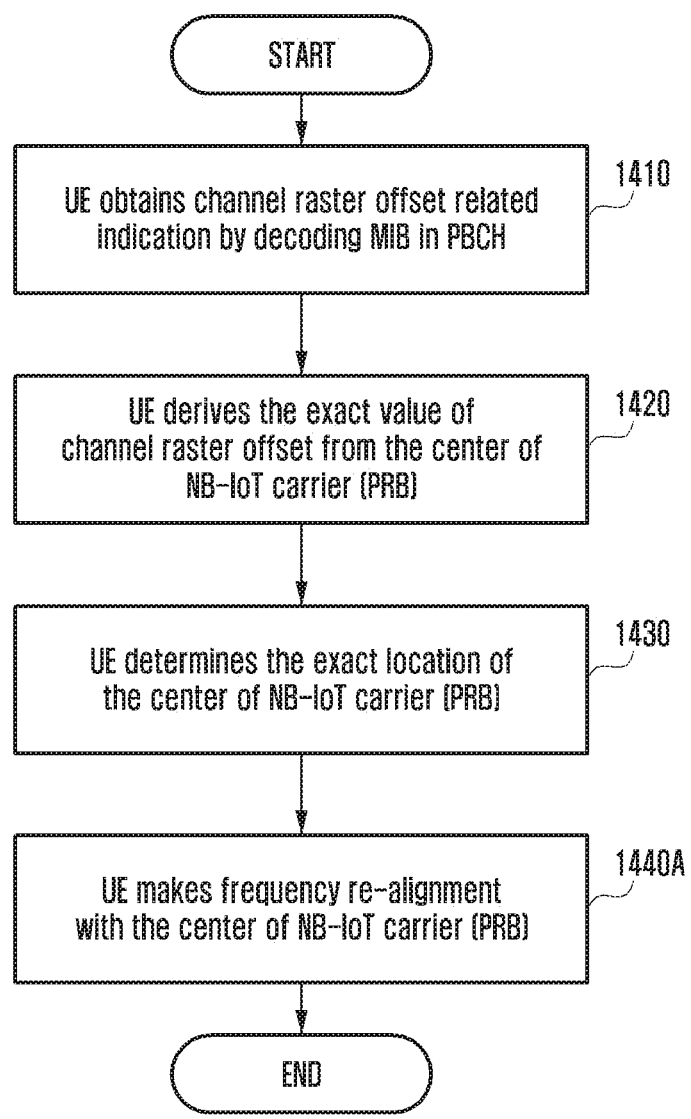
FIGS. 14A and 14B illustrate NB-IoT user equipment (UEs) utilizing an indicated channel raster offset according to an embodiment of the present disclosure.
Figure 14B:
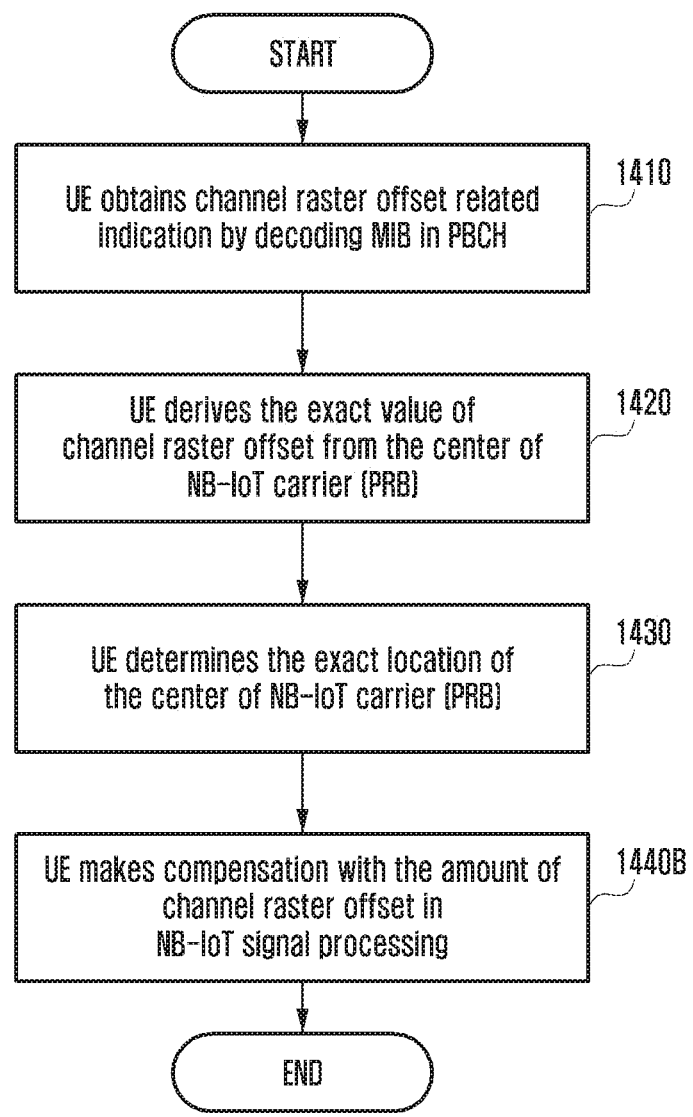

FIGS. 14A and 14B illustrate NB-IoT UEs utilizing an indicated channel raster offset according to an embodiment of the present disclosure.

Referring to FIGS. 14A and 14B, a UE obtains a channel raster offset related indication by decoding a MIB at operation 1410. The UE derives the exact value of channel raster offset from the center of NB-IoT carrier (PRB) at operation 1420. The UE determines the exact location of the center of NB-IoT carrier (PRB) at operation 1430. For example in FIG. 14A, after the UEs derive the exact value of channel raster offset, the UE can adopt this channel raster offset and make frequency re-alignment, to align with the actual center of NB-IoT carrier at operation 1440A. Alternatively, as shown in FIG. 14B, the NB-IoT UE can compensate the NB-IoT signal with the amount of the channel raster offset at operation 1440B.

Figure 15:
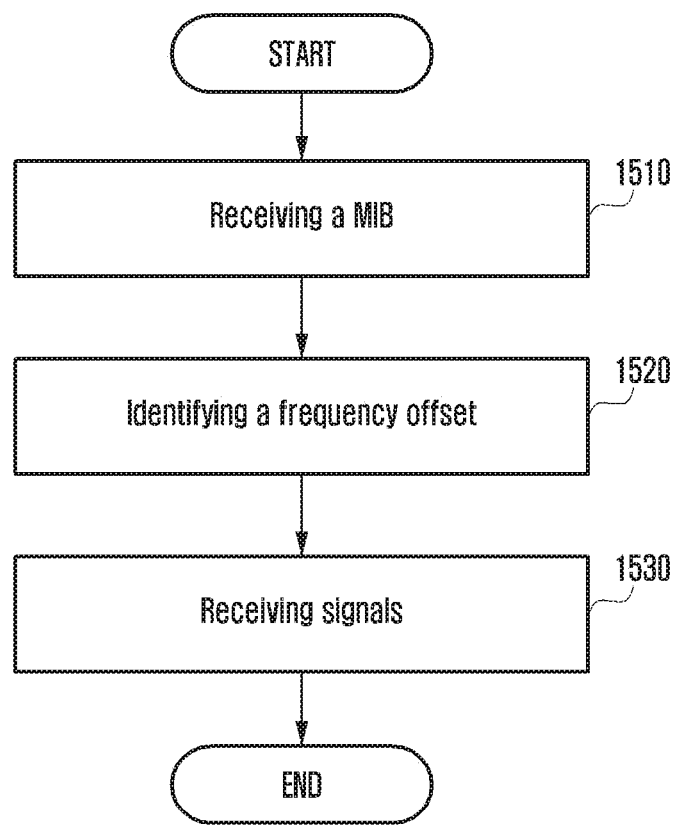
FIG. 15 illustrates a method of a wireless device for receiving signals in a wireless communication network according to an embodiment of the present disclosure.

FIG. 15 illustrates a method of a wireless device for receiving signals in a wireless communication network according to an embodiment of the present disclosure.

Referring to FIG. 15, the wireless device receives, from a base station, a MIB for a first communication using a first frequency bandwidth at operation 1510. The wireless device identifies a frequency offset between a center frequency of the first frequency bandwidth and a channel raster for a second communication based on information in the MIB at operation 1520. The first communication may refer to an NB-IoT, and the second communication may refer to an LTE. The first frequency bandwidth of the first communication may be narrower than the second frequency bandwidth of the second communication.

In addition, The MIB may comprise information on an operation mode of the first communication. In addition, as illustrated in Table 3, if the information on the operation mode indicates that the operation mode is a first mode or a second mode, the frequency offset may be received (i.e., explicitly signaled) in the MIB. The first mode may refer to a guard-band mode, namely, the first mode may indicate that a deployment scenario of the first communication correspond to a guard-band deployment. The second mode may refer to an in-band mode with different cell ID, namely, the second mode may indicate that the deployment scenario of the first communication corresponds to an in-band deployment and that a cell identifier for the first communication is different from a cell identifier for the second communication. The frequency offset may have a value in set $\{-7.5$ kHz, $-2.5$ kHz, $2.5$ kHz, $7.5$ kHz$\}$. Meanwhile, if the information on the operation mode indicates that the operation mode is a third mode, the frequency offset may be derived (i.e., implicitly signaled) from information on a cell reference signal sequence of the second communication in the MIB. The third mode may refer to an in-band mode with same cell ID, namely, indicate that a deployment scenario of the first communication corresponds to an in-band deployment and that the first communication and the second communication share a same cell identifier.

The wireless device receives, from the base station, signals, through the first communication, based on the frequency offset at operation 1530.

Figure 16:
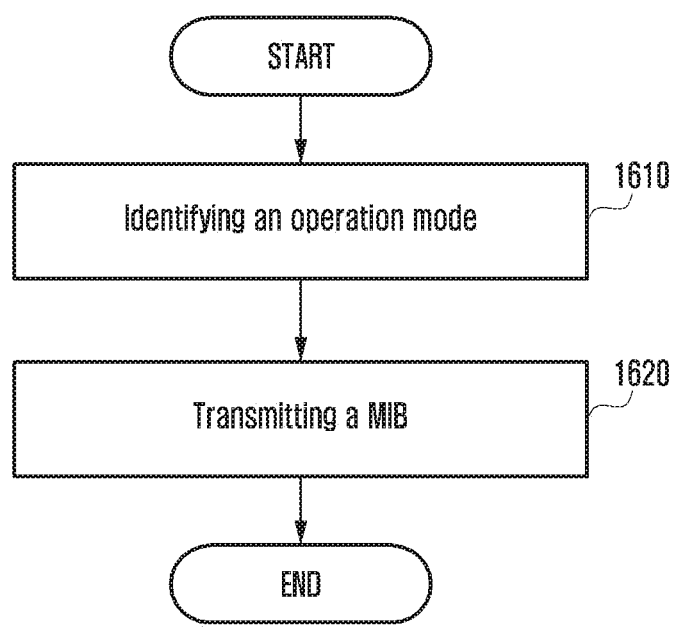
FIG. 16 illustrates a method of a base station for transmitting a MIB in a wireless communication network according to an embodiment of the present disclosure.

FIG. 16 illustrates a method of a base station for transmitting a MIB in a wireless communication network according to an embodiment of the present disclosure.

The base station identifies an operation mode of a first communication using a first frequency bandwidth at operation 1610, and the base station transmit, to a wireless device, a MIB for the first communication based on the operation mode at operation 1620. The MIB includes information for obtaining frequency an offset between a center frequency of the first frequency bandwidth and a channel raster for a second communication. Specifically, as illustrated in Table 3, wherein if the operation mode is identified as a first mode or a second mode, the MIB may comprise the frequency offset, i.e. the frequency offset may be explicitly signaled. The first mode may refer to a guard-band mode, namely, the first mode may indicate that a deployment scenario of the first communication correspond to a guard-band deployment. The second mode may refer to an in-band mode with different cell ID, namely, the second mode may indicate that the deployment scenario of the first communication corresponds to an in-band deployment and that a cell identifier for the first communication is different from a cell identifier for the second communication. The frequency offset may have a value in set $\{-7.5$ kHz, $-2.5$ kHz, $2.5$ kHz, $7.5$ kHz$\}$. Meanwhile, if the operation mode is identified as a third mode, the MIB may comprise information on a cell reference signal sequence of the second communication, and the frequency offset may be derived from the information on the cell reference signal sequence of the second communication, i.e., the frequency offset may be implicitly signaled. The third mode may refer to an in-band mode with same cell ID, namely, indicate that a deployment scenario of the first communication corresponds to an in-band deployment and that the first communication and the second communication share a same cell identifier.

The first communication may refer to an NB-IoT, and the second communication may refer to an LTE. The first frequency bandwidth of the first communication may be narrower than the second frequency bandwidth of the second communication.

Figure 17:
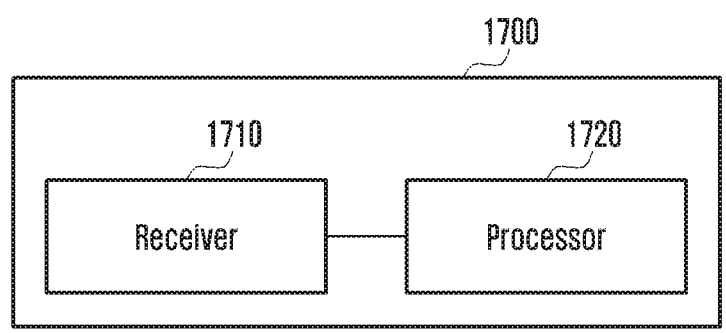
FIG. 17 is a block diagram of a wireless device for receiving signals in a wireless communication network according to an embodiment of the present disclosure.

FIG. 17 is a block diagram of a wireless device for receiving signals in a wireless communication network according to an embodiment of the present disclosure.

Referring to FIG. 17, the wireless device (1700) includes a receiver (1710) and a processor (1720). The receiver (1710) and the processor (1720) are configured to perform the steps of the method illustrated in FIG. 15. Specifically, the receiver (1710) is configured to receive, from the base station, the MIB for the first communication and signals, through the first communication. The processor (1720) is configured to identify the frequency offset between the center frequency of the first frequency bandwidth and the channel raster for the second communication based on the information in the MIB.

Figure 18:
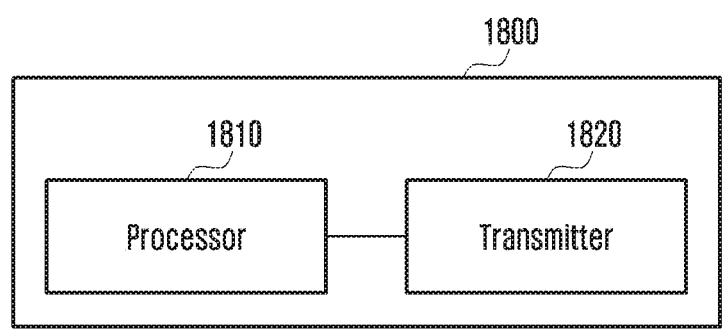
FIG. 18 is a block diagram of a base station for transmitting a MIB in a wireless communication network according to an embodiment of the present disclosure.

FIG. 18 is a block diagram of a base station for transmitting a MIB in a wireless communication network according to an embodiment of the present disclosure.

Referring to FIG. 18, the base station (1800) includes a processor (1810) and a transmitter (1820). The processor (1810) and the transmitter (1820) are configured to perform the steps of the method illustrated in FIG. 16. Specifically, the processor (1810) is configured to identify the operation mode of the first communication, and the transmitter (1820) is configured to transmit, to the wireless device, the MIB for the first communication based on the operation mode.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a wireless device for receiving signals in a wireless communication network, the method comprising:
receiving, from a base station, a master information block (MIB) for narrow band Internet of things (NB-IoT), the MIB for the NB-IoT including information on an operation mode of the NB-IoT;
identifying whether an NB-IoT cell and a Long Term Evolution (LTE) cell in an in-band deployment share a same cell identifier based on the information on the operation mode;
identifying an NB-IoT offset from LTE channel raster based on whether the NB-IoT cell and the LTE cell in the in-band deployment share the same cell identifier, wherein the NB-IoT offset is received in the MIB for the NB-IoT in case that a cell identifier for the NB-IoT cell is different from a cell identifier for the LTE cell, and the NB-IoT offset is derived from information on a physical resource block (PRB) associated with a cell reference signal of the LTE cell in the MIB for the NB-IoT in case that the NB-IoT cell and the LTE cell share the same cell identifier; and
receiving, from the base station, signals, through the NB-IoT, based on the NB-IoT offset.

2. The method of claim 1, wherein the NB-IoT offset has a value in set {-7.5 kHz, -2.5 kHz, 2.5 kHz, 7.5 kHz}.

3. A method of a base station for transmitting a master information block (MIB) for narrow band Internet of things (NB-IoT) in a wireless communication network, the method comprising:
identifying whether an NB-IoT cell and a Long Term Evolution (LTE) cell in an in-band deployment share a same cell identifier; and
transmitting, to a wireless device, an MIB for NB-IoT based on whether the NB-IoT cell and teh LTE cell in the in-band deployment share the same cell identifier,
wherein the MIB includes an NB-IoT offset from Long Term Evolution (LTE) channel raster in case that cell identifier for the NB-IoT cell is different from a cell identifier for the LTE cell, and
wherein the MIB includes information on a physical resource block (PRB) associated with a cell reference signal of the LTE cell for deriving the NB-IoT offset in case that the NB-IoT cell and the LTE cell share the same cell identifier.

4. The method of claim 3, wherein the NB-IoT offset has a value in set {-7.5 kHz, -2.5 kHz, 2.5 kHz, 7.5 kHz}.

5. A wireless device for receiving signals in a wireless communication network, the wireless device comprising:
a transceiver configured to receive, from a base station, a master information block (MIB) for narrow band Internet of things (NB-IoT), the MIB for the NB-IoT including information on an operation mode of the NB-IoT; and
a processor configured to:
identify whether an NB-IoT cell and a Long Term Evolution (LTE) cell in an in-band deployment share a same cell identifier based on the information on the operation mode,
identify an NB-IoT offset from LTE channel raster based on whether the NB-IoT cell and the LTE cell in the in-band deployment share the same cell identifier,
control the transceiver to receive the NB-IoT offset in the MIB for the NB-IoT in case that a cell identifier for the NB-IoT cell is different from a cell identifier for the LTE cell, and
derive the NB-IoT offset from information on a physical resource block (PRB) associated with a cell reference signal of the LTE cell in the MIB for the NB-IoT in case that the NB-IoT cell and the LTE cell share the same cell identifier,
wherein the transceiver is further configured to receive, from the base station, signals, through the NB-IoT, based on the NB-IoT offset.

6. The wireless device of claim 5, wherein the NB-IoT offset has a value in set {-7.5 kHz, -2.5 kHz, 2.5 kHz, 7.5 kHz}.

7. A base station for transmitting a master information block (MIB) for narrow band Internet of things (NB-IoT) in a wireless communication network, the base station comprising:
a processor configured to identify whether an NB-IoT cell and a Long Term Evolution (LTE) cell in an in-band deployment share a same cell identifier; and
a transceiver configured to transmit, to a wireless device, an MIB for NB-IoT based on whether the NB-IoT cell and the LTE cell in the in-band deployment share the same cell identifier,
wherein the MIB includes an NB-IoT offset from Long Term Evolution (LTE) channel raster in case that a cell identifier for the NB-IoT cell is different from a cell identifier for the LTE cell, and
wherein the MIB includes information on a physical resource block (PRB) associated with a cell reference signal of the LTE cell for deriving the NB-IoT offset in case that the NB-IoT cell and the LTE cell share the same cell identifier.

8. The base station of claim 7, wherein the NB-IoT offset has a value in set {-7.5 kHz, -2.5 kHz, 2.5 kHz, 7.5 kHz}.

* * * * *